US012711662B2

(12) United States Patent
Kinsella et al.

(10) Patent No.: US 12,711,662 B2
(45) Date of Patent: Aug. 18, 2026

(54) METHOD, PROGRAM, AND SYSTEM FOR 3D SCANNING

(71) Applicant: Hearables 3D Pty Ltd, Northcote (AU)

(72) Inventors: Philip Kinsella, Blackburn South (AU); Anthony Shilton, Blackburn South (AU)

(73) Assignee: Hearables 3D Pty Ltd, Northcote (AU)

( * ) Notice: Subject to any disclaimer, the term of this patent is extended or adjusted under 35 U.S.C. 154(b) by 406 days.

(21) Appl. No.: 18/406,007

(22) Filed: Jan. 5, 2024

(65) Prior Publication Data

US 2024/0144530 A1 May 2, 2024

Related U.S. Application Data

(63) Continuation of application No. PCT/AU2022/050711, filed on Jul. 7, 2022.

(30) Foreign Application Priority Data

Jul. 7, 2021 (AU) ................................ 2021902067

(51) Int. Cl.
*G06T 7/00* (2017.01)
*G06T 7/73* (2017.01)

(52) U.S. Cl.
CPC ...... *G06T 7/75* (2017.01); *G06T 2207/10028* (2013.01); *G06T 2207/30196* (2013.01)

(58) Field of Classification Search
CPC . G06T 17/00; G06T 7/73; G06T 2207/10016; G06T 2207/30196;

(Continued)

(56) References Cited

U.S. PATENT DOCUMENTS 9,332,243 B2 5/2016 Klusza et al.
11,049,331 B2 6/2021 Kinsella
(Continued)

FOREIGN PATENT DOCUMENTS

WO 2019104397 A1 6/2019
WO 2023279163 A1 1/2023

OTHER PUBLICATIONS

Nightingale, Renee C., et al. “Frugal 3D scanning using smartphones provides an accessible framework for capturing the external ear.” Journal of Plastic, Reconstructive & Aesthetic Surgery 74.11 (2021): 3066-3072.*

(Continued)

*Primary Examiner* — Li Liu
(74) *Attorney, Agent, or Firm* — Dinsmore & Shohl LLP

(57) ABSTRACT

Aspects relate to scanning a subject ear, including: capturing images of the subject ear; on a repetitive basis per image: automatically detecting a position of each of a plurality of key surface features on the ear within the image to determine a relative 3D orientation of the imaging lens to the ear; based on the determined relative orientation and positions of the key surface features within the frame, determining a relative 3D position of the imaging lens to the ear; outputting the determined relative 3D orientation and the determined relative 3D position; rendering: the determined relative 3D orientation and the determined relative 3D position; one or more targets, each target being a target relative 3D orientation and target relative 3D position of the imaging lens to the ear; and periodically updating the dynamic image to illustrate the most recently received determined relative 3D orientation and determined relative 3D position.

20 Claims, 10 Drawing Sheets

(58) Field of Classification Search
CPC . G06T 2207/30244; G06T 7/55; G06T 17/05; G06T 2200/04; G06T 2207/20101; G06T 7/60; G06V 20/20; G06V 40/10; G06V 40/171; H04N 13/204; H04N 13/221; H04N 13/243; H04N 2013/0074; H04N 23/611
See application file for complete search history.

(56) References Cited

U.S. PATENT DOCUMENTS

| | | | | |
|---|---|---|---|---|
| 2013/0237754 | A1 | 9/2013 | Berglund et al. | |
| 2015/0170416 | A1* | 6/2015 | McGregor | G06T 19/20 345/420 |
| 2015/0382123 | A1 | 12/2015 | Jobani | |
| 2016/0101571 | A1 | 4/2016 | Schouwenburg et al. | |
| 2017/0053422 | A1 | 2/2017 | Chojnowski et al. | |
| 2020/0128342 | A1* | 4/2020 | Hoorzad | H04R 31/00 |
| 2020/0211277 | A1* | 7/2020 | Rugolo | G06N 20/00 |
| 2021/0089773 | A1* | 3/2021 | Yang | H04N 23/63 |
| 2022/0101595 | A1* | 3/2022 | Yi | G06F 18/22 |
| 2022/0159362 | A1* | 5/2022 | Kirkpatrick | H04R 1/105 |

OTHER PUBLICATIONS

Kinsella, Philip. Analysis and design of in-ear devices. Diss. Swinburne, 2018.*

Australian Patent Office, International Search Report for International Application No. PCT/AU2022/050711, dated Sep. 12, 2022, 4 pages.

Australian Patent Office, Written Opinion for International Application No. PCT/AU2022/050711, dated Sep. 12, 2022, 7 pages.

Australian Patent Office, International Preliminary Report on Patentability for International Application No. PCT/AU2022/050711, dated Jun. 5, 2023, 6 pages.

* cited by examiner

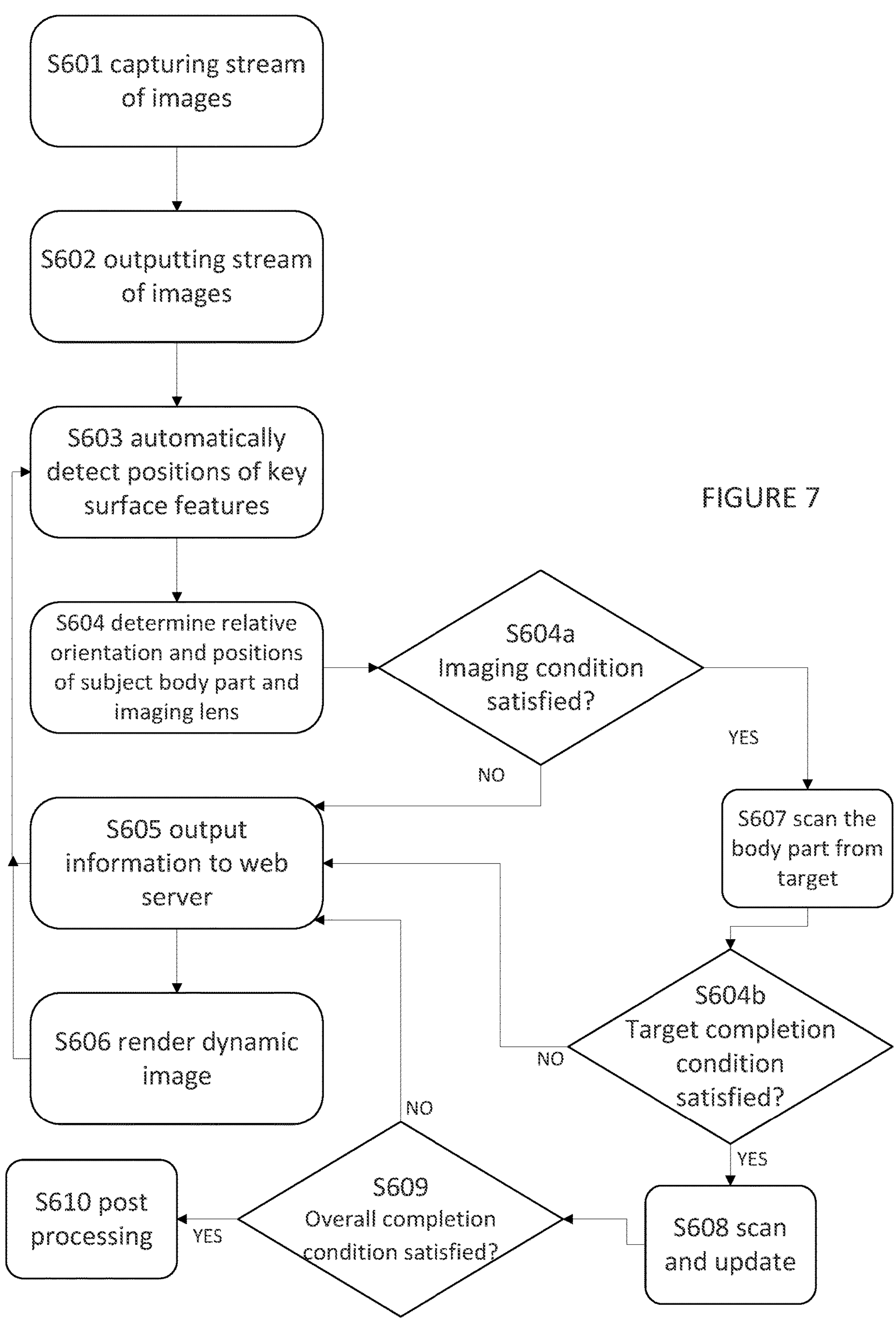
S601 capturing stream of images
S602 outputting stream of images
S603 automatically detect positions of key surface features
FIGURE 7
S604 determine relative orientation and positions of subject body part and imaging lens
S604a Imaging condition satisfied?
YES
NO
S605 output information to web server
S607 scan the body part from target
S604b Target completion condition satisfied?
NO
S606 render dynamic image
NO
YES
S610 post processing
YES
S609 Overall completion condition satisfied?
S608 scan and update

METHOD, PROGRAM, AND SYSTEM FOR 3D SCANNING

CROSS-REFERENCE TO RELATED APPLICATIONS

This application is a continuation of International Patent Application No. PCT/AU2022/050711, filed Jul. 7, 2022, which claims priority to Australian Patent Application No. 2021902067, filed Jul. 7 2021, each of which are incorporated by reference herein in their entirety.

TECHNICAL FIELD

This invention lies in the field of 3D scanning and in particular relates to 3D scanning of a body part such as an ear with a handheld imaging apparatus.

BACKGROUND

Providers of goods and services specific to an individual may require a 3D scan of a body part of the individual in order to appropriately customize the provision. An example is the human ear, which exhibits considerable geometric diversity from one individual to another. Providers of medical services relating to a subject ear, or of customized devices relating to a subject ear, may require an accurate 3D data domain representation of a physical domain subject ear.

Difficulties exist in obtaining a 3D data domain representation of a physical domain subject ear, since elements of the geometry of a subject ear are completely or partially obscured at different imaging orientations, at least partially due to line-of-sight obscuration by other elements of the subject ear.

Existing techniques for obtaining a 3D data domain representation of a physical domain subject ear include direct ear scanners which insert a laser scanner directly into the ear, and shape detection via insertion of an inflatable balloon into the ear. Existing techniques are not replicable in the absence of specialist equipment and do not yield an accurate 3D data domain representation of the physical domain subject ear.

STATEMENTS

Embodiments of the present invention are set out in the appended claims.

A method comprises: at a handheld imaging apparatus, capturing a stream of images via an imaging lens and outputting the stream to a local processing apparatus, the images imaging a field of view including an ear of a subject; at the local processing apparatus: receiving the stream of images, and, on a repetitive basis per image: automatically detecting a position of each of a plurality of key surface features on the ear within the image to determine a relative 3D orientation of the imaging lens to the ear; based on the determined relative orientation and positions of the key surface features within the frame, determining a relative 3D position of the imaging lens to the ear; outputting, to the web server, the determined relative 3D orientation and the determined relative 3D position; at the web server: hosting a web page comprising a dynamic image rendering: the determined relative 3D orientation and the determined relative 3D position; one or more targets, each target being a target relative 3D orientation and target relative 3D position of the imaging lens to the ear; including periodically updating (in real time) the dynamic image to illustrate the most recently received determined relative 3D orientation and determined relative 3D position; the method further comprising: at the handheld imaging apparatus, acquiring a 3D scan of the subject ear from the one or more targets.

Advantageously, embodiments provide a web page that acts as a real-time feedback mechanism accessible by the subject that communicates a real-time (to within a latency period caused by data transfers and data processing) representation of a relative orientation and position of the subject ear and a handheld imaging apparatus, and how that relative orientation and position relates spatially to one or more target orientations and positions. Embodiments effectively guide the subject such that the subject can use a handheld imaging device such as a mobile phone (configured to generate depth maps) to scan their own ear.

Embodiments leverage a particular image processing method to minimize information transfer from a local processing apparatus to web server hosting the web page, so that a latency period from a change in the relative orientation and position of the handheld imaging apparatus to the subject ear occurring in the physical domain, to the change being shown in the dynamic image rendered on the web page, is minimized. In particular, the latency period is far smaller than experienced in traditional screen mirroring applications.

Methods discussed herein may be implemented by a system including the web server, the handheld imaging apparatus, and a web-enabled device. A suite of computer programs may be executed by the system in order to instruct the system to perform the method steps discussed herein. Thus, it is implicit that where method steps are discussed, embodiments may include software configured for implementing said method steps. The method may be computer-implemented.

Optionally, the method further comprises: at a web-enabled device having a display unit (and being visible to the subject), accessing the web page and displaying the dynamic image. Advantageously, the feedback loop from handheld imaging apparatus, to web server, and back to subject, is complete.

Optionally, the method further comprises: at the local processing apparatus, on a repetitive basis per image among the two-dimensional images, determining whether or not an imaging condition is satisfied for the one or more targets in the dynamic image, the imaging condition being that the most recently determined relative 3D orientation and the determined relative 3D position are within a predefined range of the target relative 3D orientation and the target relative 3D position of one of the one or more targets; and if the imaging condition is satisfied, causing the handheld imaging device to acquire a 3D scan of the subject ear from the target. The imaging condition determines when the handheld imaging apparatus is in a position and orientation at which to acquire a 3D scan of the subject ear.

Optionally, the 3D scan of the subject ear from the target is acquired via the imaging lens of the imaging apparatus and a depth detector. Advantageously, the depth detector is employed to acquire depth information per pixel.

Optionally, the 3D scan of the subject ear from the target is acquired via 2D images from the imaging lens of the handheld imaging apparatus and a machine learning algorithm trained to predict depth information from 2D images of ears. Advantageously, methods may be performed and 3D information obtained even in the absence of operational depth detector hardware.

Optionally, the method further comprises following causing the handheld imaging device to acquire the 3D scan of the subject ear from the target, determining whether or not a target completion condition is satisfied, and if the target completion condition is not satisfied, repeating the determining whether or not the imaging condition is satisfied, and if the imaging condition is satisfied, replacing the acquired 3D scan of the subject ear from the target with a replacement 3D scan of the subject ear from the target, and determining whether or not the target completion condition is satisfied. The target completion conditions provide a mechanism to control the progression through plural targets.

Optionally, the target completion condition is that the respective 3D scan of the subject ear from the target is acquired by the handheld imaging device, or wherein the target completion condition is based on an image quality characteristic of the respective 3D scan of the subject ear from the target and/or detection of a predefined surface feature within the respective 3D scan of the subject ear from the target.

Optionally, the one or more targets rendered in the dynamic image are a subset of a larger set of targets, and, following each occurrence of the target completion condition being satisfied, the web server is caused to render in the dynamic image a further target from the larger set of targets not already rendered in the dynamic image, until an overall completion condition is satisfied.

Optionally, the overall completion condition is that there are no further targets in the set of targets or that the target completion condition is satisfied for a predetermined number and/or predetermined subset of targets from the set of targets.

The overall completion condition is for the specific ear being scanned. Upon completion, if two ears are to be scanned and one ear is pending, the method is repeated for the remaining ear.

In a particular example, the targets are rendered in the dynamic image one at a time in a predefined sequence. The predefined sequence may be configured to minimize aggregate distance between sequentially adjacent targets.

Optionally, the dynamic image renders more than one target concurrently, and the more than targets are rendered according to a first rendering mode if the respective target completion condition has not been satisfied, and according to a second rendering mode if the respective target completion condition has been satisfied.

Optionally, if it is determined that the imaging condition is not satisfied, determining whether or not an auxiliary imaging condition is satisfied for the one or more targets in the dynamic image, the auxiliary imaging condition being that the determined relative 3D orientation and the determined relative 3D position are within an auxiliary predefined range of the target relative 3D orientation and the target relative 3D position of one of the one or more targets; and if the auxiliary imaging condition is satisfied, causing the handheld imaging device to obtain, as an auxiliary 3D scan, a 3D scan of the subject ear. Auxiliary scanning provides a means to assist in the post-processing of the 3D scans.

Optionally, the 3D scans of the subject ear from the targets satisfying the respective target completion conditions are stored at the local processing apparatus for post processing and/or output by the local processing apparatus for post processing.

Optionally, the method further comprises storing at the local processing apparatus for post processing and/or output by the local processing apparatus for post processing, the auxiliary 3D scan or scans of the subject ear.

Optionally, the imaging apparatus and the local processing apparatus are components of a single device, the single device being a smartphone or a tablet computer. A smartphone in the present context is a mobile phone with a camera, optionally with a depth detector, and with processing hardware (for example, CPU and/or GPU) for executing a pre-trained machine learning algorithm.

Optionally, the dynamic image illustrates the determined relative 3D orientation and the determined relative 3D position by illustrating an avatar having at least an ear, the orientation and position of the avatar within the image being fixed in the dynamic image. Advantageously, the avatar imitates reality and thus facilitates comprehension of the dynamic image by the subject.

Optionally, the web server is configured to host instances of the web page comprising the dynamic image for each of a plurality of subjects, each subject being associated with a unique access code, wherein the method further comprises: at the local processing apparatus: outputting the determined relative 3D orientation and the determined relative 3D position to the web server in association with the access code unique to the subject; at the web server: allowing a web-enabled device to access the web page comprising the dynamic image illustrating the determined relative 3D orientation and the determined relative 3D position associated with the code on condition of receipt of the same access code from the web-enabled device.

Optionally, the automatically detecting a position of each of a plurality of key surface features on the ear within the image to determine a relative 3D orientation of the imaging lens to the ear comprises: feeding the two-dimensional image into a machine learning algorithm pre-trained to detect the location of the ear, such as within a bounding box, whether the ear is a left side ear or a right side ear, and the position within the image of the plurality of key surface features on the ear.

Optionally, each image of the video stream of images is a two-dimensional image composed of pixels and is associated with a respective depth map, either through further processing of the two dimensional image or directly obtained contemporaneously by the handheld imaging device and providing a depth measurement for each pixel in the two-dimensional image, and wherein automatically detecting a position of each of a plurality of key surface features on the ear within the image to determine a relative 3D orientation of the imaging lens to the ear comprises: acquiring from the respective depth map a depth measurement for the detected position of each of the plurality of key surface features to define a three-dimensional position for each of the plurality of key surface features; fitting a reference plane to the three-dimensional positions for the plurality of key surface features, the reference plane being defined in 3D relative to the orientation of the imaging lens.

Optionally, the method further comprises, at the local processing apparatus or at a post processing server: combining the 3D scans of the ear to obtain a single composite 3D scan of the ear of the subject.

Optionally, the handheld imaging apparatus is a smartphone or a tablet device having a front or back facing depth sensor and an imaging lens, the imaging lens is a front or back facing lens in accordance with whether the depth sensor is front or back facing, and wherein each image of the stream of images includes pixel-wise depth measurements obtained via the front or back facing depth sensor.

Optionally, the handheld imaging apparatus is a smartphone or a tablet device having a rear facing lens and a rear facing depth sensor, and wherein the imaging lens is the rear facing lens and the depth sensor is the rear facing depth sensor.

Optionally, the method further comprises, at the local processing apparatus: outputting, to the web server, a live stream from the handheld imaging apparatus, the live stream being either the stream of images or a series of images extracted from the stream of images, wherein at the web server the live stream is rendered in addition to the dynamic image, and the dynamic image is rendered as an overlay on the rendered live stream scaled and positioned so that the ear relative to which the relative 3D position and the relative 3D orientation are determined is co-located and co-oriented with an ear in the live stream.

Optionally, the live stream is a series of images extracted from the stream of images obtained by the handheld imaging apparatus, and in the live stream: a frequency of images is reduced relative to the stream of images obtained by the handheld imaging apparatus so that 1 in every n images is included in the live stream; and/or a resolution of images is reduced relative to the stream of images obtained by the handheld imaging apparatus.

A method comprises: at a handheld imaging apparatus, capturing a stream of images via an imaging lens and outputting the stream to a local processing apparatus, the images imaging a field of view including a body part of a subject. The method comprises, at the local processing apparatus: receiving the stream of images, and, on a repetitive basis per image: automatically detecting a position of each of a plurality of key surface features on the body part within the image to determine a relative 3D orientation of the imaging lens to the body part; based on the determined relative orientation and positions of the key surface features within the frame, determining a relative 3D position of the imaging lens to the body part; outputting, to the web server, the determined relative 3D orientation and the determined relative 3D position. The method further comprises, at the web server: hosting a web page comprising a dynamic image rendering: the determined relative 3D orientation and the determined relative 3D position; one or more targets, each target being a target relative 3D orientation and target relative 3D position of the imaging lens to the body part. The rendering includes periodically updating the dynamic image to illustrate the most recently received determined relative 3D orientation and determined relative 3D position. The method further comprises: at the handheld imaging apparatus, acquiring a 3D scan of the subject body part from the one or more targets.

Embodiments may include a system comprising a handheld imaging apparatus, a processing apparatus (being a local processing apparatus by virtue of being in a same device or same local area network as the handheld imaging apparatus), and a web server: the handheld imaging apparatus being configured to capture a stream of images via an imaging lens and outputting the stream to a local processing apparatus, the images imaging a field of view including an ear of a subject; the processing apparatus being configured to: receive the stream of images, and, on a repetitive basis per image: automatically detect a position of each of a plurality of key surface features on the ear within the image to determine a relative 3D orientation of the imaging lens to the ear; based on the determined relative orientation and positions of the key surface features within the frame, determine a relative 3D position of the imaging lens to the ear; output, to the web server, the determined relative 3D orientation and the determined relative 3D position; the web server being configured to: host a web page comprising a dynamic image, and rendering the dynamic image to include: the determined relative 3D orientation and the determined relative 3D position; one or more targets, each target being a target relative 3D orientation and target relative 3D position of the imaging lens to the ear; rendering the dynamic image including periodically updating the dynamic image to illustrate the most recently received determined relative 3D orientation and determined relative 3D position; the handheld imaging apparatus being further configured to acquire a 3D scan of the subject ear from the one or more targets.

The system may further comprise a web-enabled device having a display unit, the web-enabled device being configured to access the web page and display the dynamic image.

The system may further comprise a post processing server being configured to combine 3D scans of the ear from more than one target to obtain a single composite 3D scan of the ear of the subject.

Embodiments include software comprising processing instructions, which, when executed by a local processing apparatus and a web server having respective memory hardware and processing hardware, cause the local processing apparatus and the web server to perform a method including: causing a handheld imaging apparatus to capture a stream of images via an imaging lens and outputting the stream to a local processing apparatus, the images imaging a field of view including an ear of a subject; at the local processing apparatus: receiving the stream of images, and, on a repetitive basis per image: automatically detecting a position of each of a plurality of key surface features on the ear within the image to determine a relative 3D orientation of the imaging lens to the ear; based on the determined relative orientation and positions of the key surface features within the frame, determining a relative 3D position of the imaging lens to the ear; outputting, to the web server, the determined relative 3D orientation and the determined relative 3D position; at the web server: hosting a web page comprising a dynamic image rendering: the determined relative 3D orientation and the determined relative 3D position; one or more targets, each target being a target relative 3D orientation and target relative 3D position of the imaging lens to the ear; the rendering including periodically updating the dynamic image to illustrate the most recently received determined relative 3D orientation and determined relative 3D position; the method further comprising: causing the handheld imaging apparatus to acquire a 3D scan of the subject ear from the one or more targets.

Embodiments include a computer program or computer programs which, when executed by a local processing apparatus in the same device or same local area network as a handheld imaging apparatus, and a web server, cause the local processing apparatus and the web server to perform a method disclosed herein, wherein the handheld imaging apparatus is caused to capture the stream of images and acquire the scans under the control of the local processing apparatus.

DETAILED DESCRIPTION

A detailed description of embodiments follows, purely by way of example, with reference to the following drawings, in which:

FIG. 7 is a flowchart of a method of an embodiment;

Figure 1:
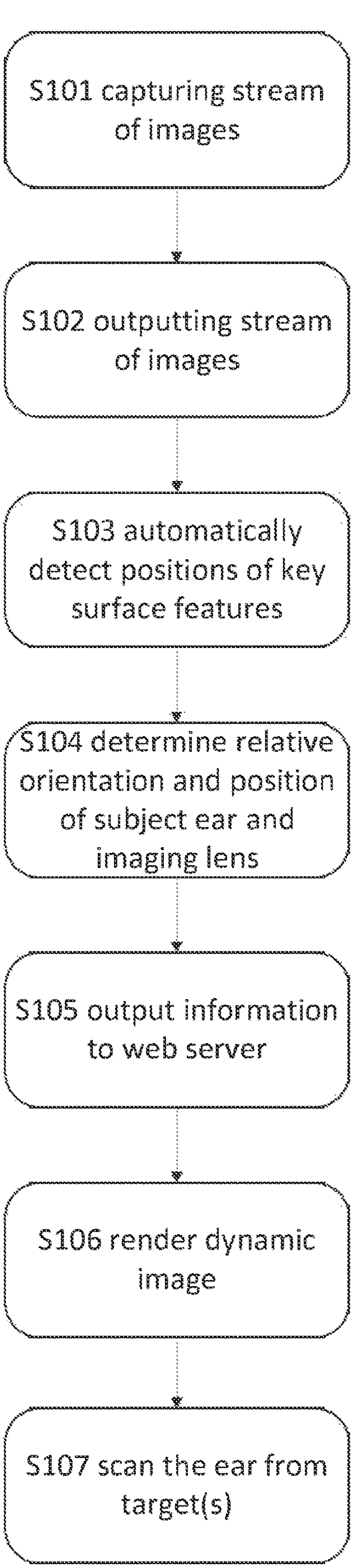
FIG. 1 is a flowchart of an embodiment.

FIG. 1 illustrates an exemplary method of an embodiment, comprising steps S101 to S107. The method may be performed by a hardware arrangement such as that illustrated in FIG. 2, noting that the method does not require each of the components of the hardware arrangement of FIG. 2. For example, the web-enabled device 40 is optional and is a means for accessing the web page hosted by the web server 10. The web page hosted by the web server 10 may be a page of a web app. The local processing apparatus 20 is illustrated as a separate device from the handheld imaging apparatus 30. The local processing apparatus 20 and the handheld imaging apparatus 30 may be components of the same device. In embodiments in which the handheld imaging apparatus 30 and the local processing apparatus 20 are separate devices, the local processing apparatus 20 may replace the web-enabled device 40 as a means for accessing the web page hosted by the web server 10.

Figure 2:
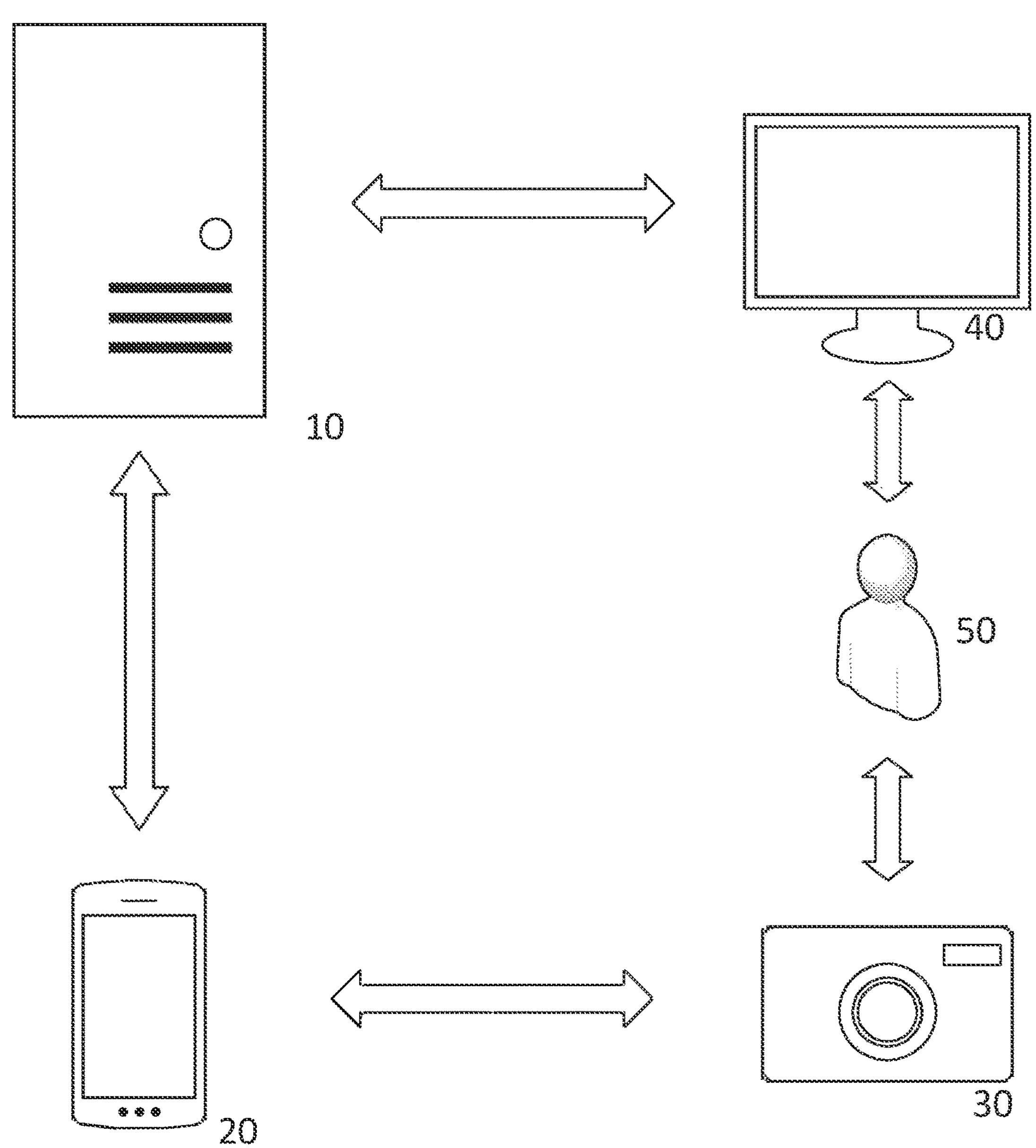
FIG. 2 is a hardware arrangement in an embodiment.

Arrows in FIG. 2 illustrate flows of information between components. The information may be as physical data, or in the example of the arrow from the web-enabled device 40 to the subject 50, is via the sensory system of the subject 50. The arrows in FIG. 2 are not exhaustive insofar as information may flow between components not indicated by arrows in FIG. 2. Furthermore, there may be arrows in FIG. 2 that are optional and represent non-essential information flows.

An explanation will now be provided of the method of FIG. 1 with reference to the hardware arrangement of FIG. 2.

Capture Image Stream

At step S101 a stream of images is captured. The stream of images is captured by the handheld imaging apparatus. The handheld imaging apparatus has a data communication connection to a local processing apparatus 20. For example, the handheld imaging apparatus 30 and the local processing apparatus 20 may be components of the same device. The device may be, for example, a smartphone, or a tablet computing device. The handheld imaging device may be a dedicated digital camera (not part of a smartphone) connectable to a local processing apparatus 20 wirelessly or via a wired connection, wherein the local processing apparatus 20 may be a desktop computer, a laptop computer, a tablet computer, a smartphone, or some other smart appliance such as a smart TV.

The stream of images are obtained via an imaging lens. The imaging lens is an optical lens configured to focus light from a field of view onto an imaging sensor such as a CCD. The imaging lens is a component of the handheld imaging apparatus 30. The field of view includes an ear of a subject 50. In practice, images may be captured in which the ear is not within the field of vision, or is partially or totally obscured. Whilst in practice such images do form part of the captured stream and will need to be filtered out from further processing by the local processing apparatus 20, it is assumed in this document that where reference is made to the stream of images (captured via the imaging lens), that the component images of the stream do contain the subject ear within the field of view. For example, the stream of images may be a video stream. The video stream may be captured at a frame rate of 30 frames per second (fps). Embodiments may filter images out of the image stream to constrain the frame rate to 30 fps, or to some other goal frame rate, in order to prevent buffer overflows in the processing pipeline that could diminish the effect of real time feedback for the subject via the web page.

Depth Sensors

The imaging device may be an internet-enabled communications device such as a smartphone or a tablet with a display screen or a principal display screen on a first surface defining that first surface as a front face, wherein a front facing direction is outward (i.e. orthogonal) from a plane of said front face. An opposing face is a rear face, with a rear facing direction being outward or orthogonal from a plane of said rear face. The imaging device may comprise a front facing imaging lens and a rear facing imaging lens. Each imaging lens may be associated with respective imaging circuitry such as imaging sensor to form a camera, i.e. a front facing camera and a rear facing camera.

Embodiments may provide a subject with a choice of modes, wherein in a front facing mode the imaging lens used to capture the stream of images is the front facing imaging lens, and in a rear facing mode the imaging lens used to capture the stream of images is the rear facing lens. Alternatively, embodiments may provide only a single mode being either the front facing mode or the rear facing mode.

In front facing mode and in rear facing mode, a depth map may be included in or provided in association with each image among the stream of images (or a subset of the stream of images such as one per n images wherein n is a positive integer such as 1, 2, 3, 4, 5, or 10, for example).

When the handheld imaging apparatus (i.e. imaging device) is a smartphone or tablet, the local processing apparatus and the handheld imaging apparatus are the same device. Mobile devices such as smartphones and tablets are typically provided with a depth sensor at a front or rear/back surface to provide depth maps as part of or in association with images obtained via the correspondingly facing imaging lens. Therefore, in the front facing mode a depth measurement per pixel may be provided by the front facing depth sensor. In the rear facing mode a depth measurement per pixel may be provided by the rear facing depth sensor. It is noted that the rear surface of a smart phone or tablet may also be provided with a depth sensor and therefore in the rear facing mode a depth measurement per pixel may be provided by the rear facing depth sensor. However, embodiments may be implemented in devices in which the surface at which an imaging lens faces/receives light is not provided with a depth sensor and therefore in the front/rear facing mode as appropriate the captured stream of images may be 2D images with depth information being added by an appropriately trained machine learning algorithm. In the case of the depth information being added by the machine learning algorithm, it is noted that the algorithm may be trained to predict relative depths of identifiable topological features of the ear, so that an ear and/or one or more topological features of the ear are identified by the machine learning algorithm mad depth information predicted therefor, rather than predicting depth informant for the entire image.

In the front facing mode, the principal display screen of the imaging device is facing at the subject ear and therefore the web-enabled device accessing the web page and displaying the dynamic image may be a distinct device from the imaging device. In the rear facing mode, an operator of the imaging device may be the subject themselves, in which case they may select to use a device distinct from the imaging device as the web-enabled device for displaying the dynamic image. As a further option, the operator of the imaging device may be somebody else (i.e. not the subject), in which case the operator may decide to use the imaging device as the web-enabled device for displaying the dynamic image (assuming it has the appropriate capabilities i.e. it is a smartphone or tablet). From the perspective of the web server and the overall process of the embodiment, no modifications are required to accommodate different web-enabled devices, as long as a device is accessing the hosted web page (via a browser or dedicated application) that device assumes the role of web-enabled device. Of course, it would be possible to access the web page via plural devices so that there could be multiple web-enabled devices displaying the dynamic image from the web page.

The image capture and the calculation of the location and orientation of the phone are performed on the phone. The images along with the location/orientation information is sent to the web server which renders the augmented reality targets over the images and presents them. In this way the targets can be seen on both the device screen and on a secondary display (wherein the secondary display may also be referred to as a web-enabled device having a display unit).

Output Image Stream

At S102 the stream of images is output to, or otherwise obtained by, the local processing apparatus 20. For example, the stream of images may be stored at a memory location accessible to the local processing apparatus 20. The stream of images may be transferred to the local processing apparatus 20 via a wired connection such as HDMI, USB-C, or any other wired data connection of sufficient bandwidth. The stream of images may be transferred to the local processing apparatus 20 wirelessly over a direct connection such as via a data transfer protocol, for example, Bluetooth, or may be transferred via a wireless local area network.

Process Image Stream at Local Processing Apparatus

The images among the stream of images are individually processed by the local processing apparatus 20. The local processing apparatus 20 may parallelize one or more aspects of the processing, or may process the images in a serial manner. For example, the local processing apparatus 20 may be processing more than one image at a time, in a staggered fashion.

The processing at the local processing apparatus 20 is to transform each image into two pieces of information: a relative orientation of the imaging lens to the subject ear (according to the image), and a relative position of the imaging lens to the subject ear. The two pieces of information are transmitted (uploaded) to a web server 10, to enable the web server 10 to render a dynamic image showing the relative position of the imaging lens and the subject ear, without requiring the images themselves to be transmitted.

Connection Between Local Processing Apparatus and Web Server

The local processing apparatus 20 may be connected to a web app hosted by the web server 10. The web app provides processing instructions to the local processing apparatus 20. In the method of FIG. 1, the processing performed by the local processing apparatus 20 may be executing processing instructions obtained from the web server 10 via the web app. Access to the web app may be password protected or may require a code to be entered. Since connection to the web app is possible for the local processing apparatus 20 and the web-enabled device 40, the web app may provide a mechanism for identifying a device as either local processing apparatus 20 or web-enabled device 40 when entering the code and establishing a connection. For example, a subject can connect a device to the web app as a camera phone (i.e. local processing apparatus 20), and can connect another device to the web app as a viewer (i.e. the web-enabled device 40). The web app is configured to provide different processing instructions in each case.

Automatically Detect Key Surface Features

At the local processing apparatus 20, a first processing step is S103, automatically detecting a position of each of a plurality of key surface features on the ear within the image. The key surface features are anchor points. The key surface features are generic geometric features of ears, which when located for a specific ear enable a position and orientation of the ear to be determined. The key surface features are a set of, for example, eight surface features, preselected by experts in the field of aural scanning.

The key surface features may include one or more from among: super auricle, sub auricle, posterior auricle, helix root, anterior notch (top of), antihelix, antitragus, posterior auricular sulcus, superior and inferior crura of antihelix, supratragal tubercle, Darwinian tubercle.

For example, the automatic detection may be automated by a machine learning algorithm, pre-trained to recognize (i.e. to locate) within an image the key surface features. The machine learning algorithm may be an object recognition neural network trained with images of a number of different subject ears taken in a number of different lighting conditions, by a number of different imaging apparatus, and from a number of different viewing angles. The subject ears represent different genders, ages, and ethnicities. The training may be performed using a library such as PyTorch. The training images are manually labelled with the locations of the key surface features. The loss function may be, for example, to reduce an aggregate (across all key surface features) disparity between the labelled location of the key feature and the location of the key feature predicted (i.e. given, provided, output) by the neural network.

As an example, the machine learning model splits an input image frame into a series of boxes, randomly positioned and with different sizes. It then processes each box to determine the likelihood that the ear is imaged within the box, and that the or each keypoint is within the box. The model then outputs a highest likelihood that ear and the or each of the keypoints are imaged within the box. The highest likelihood is compared with a threshold to determine whether it is a good detection or not. The process continues iteratively until a good detection is achieved.

The key surface features may be detected on 2D images of the field of view, for computationally efficiency and near real-time feedback on positioning and orientation via the web page. A corresponding depth map may be obtained by the handheld imaging device but not leveraged in detecting the key surface features. The key surface features may be interpolated to for greater stability. The number of key surface features is a configurable parameter and may be adapted according to implementation, and somewhat based on processing capability. Different embodiments may be made available to different users or subjects depending on processing capability of the local processing apparatus.

The key surface features are geometric points on the ear that can be identified and placed on any ear, but the specific selection of key surface features is not limited and can vary according to implementation. Training images are labelled with the key surface features so a consideration in selection of location and number of key surface features may be ease of annotating the training images. A typical number of key surface features may be 8. A number of key surface features may be as high as 50. A further consideration of key surface features is visibility across different viewpoints. Key surface features may be selected that are visible at different viewpoints so that, for example, a minimum of three key surface features is visible from any viewpoint.

Automatic Detection Machine Learning Algorithm

The machine learning algorithm may be implemented on a machine learning model embedded on an application installed on the local processing apparatus 20. In a particular example, the local processing apparatus 20 may be an Apple® iPhone and the machine learning model may be embedded on an iPhone application as a CoreML (the native machine learning architecture of Apple® products).

For example, the web app provides processing instructions to the local processing apparatus 20 that customize or configure the embedded machine learning model using parameters (such as weights and biases) previously calculated in a training phase. The generic machine learning model on the local processing apparatus 20 is thereby configured to function as the machine learning algorithm pre-trained to recognize the predetermined key surface features within an image.

In a particular example, the machine learning algorithm is built from a single shot descriptor (SSD) architecture. An exemplary SSD is MobileNetV3 and EfficientDet. The base of the algorithm is MobileNetV3 and the heads are EfficientDet.

The local processing apparatus 20 may execute one or more preprocessing steps between receiving an image from the image stream and the automatic detection of the key surface features (i.e. before step S103). The preprocessing may include, for example, resizing the image to a predetermined height and width (by number of pixels). The predetermined height and width may be selected for optimum processing speed by the algorithm performing the automatic detection.

Determining Relative Orientation and Position

Step S104 comprises using the detected key surface features to determine a relative orientation of the subject ear to the imaging lens, and to use the determined relative orientation and the position of the key surface features within the image to determine a relative position of the subject ear to the imaging lens. Both the determined relative orientation and the determined relative position are determined in three spatial dimensions.

Determining Relative Orientation

For example, the automatic detection of the key surface features of S103 may detect the key surface features on a two dimensional image. A contemporaneous depth map acquired by the handheld imaging device provides a depth measurement for each pixel in the two-dimensional image. Once the key surface features positions are detected at S103, the depth map can be referenced to obtain depth measurements for each of the key surface features thereby to place each of the key surface features in three dimensions. A plane fitting technique, such as RANSAC, can be used to fit a plane to the three dimensional placements of the key surface features. An alternative plane fitting technique, such as Hough transform, could be used instead. The number of key surface features is, for example, eight, and depending on field of view, image composition, and angle, it may be that not all eight are detectable in each image, so that eight is a maximum number of points to which the plane is fitted. Hence the plane fitting is fast and not computationally expensive, even for a smartphone processor.

The fitted plane gives a normal angle from the center of the ear, using which normal angle the local processing apparatus may define roll, pitch, and yaw angles (which are implicitly relative to the handheld imaging apparatus), as well as translation angles for the orientation of targets relative to the ear.

Embodiments may fit the plane to a subset of the detected key surface features. For example, the machine learning algorithm performing the automatic detection at S103 may be configured to output a confidence score associated with each detection. Embodiments may filter out from the plane fitting detected key surface features with a confidence score below a predefined threshold. Alternatively, embodiments may choose only the top n by confidence score (wherein n=3, 4, 5, 6, or 7) key surface features for plane fitting.

The orientation of the ear is determined in three-dimensional space. The orientation may be computed from a two dimensional image and a corresponding depth map obtained by physical measurement via a depth detector in the handheld imaging apparatus. Alternatively, the orientation may be computed from the two dimensional image and a key surface feature depth predictor. The key surface feature depth predictor being a machine learning algorithm trained to predict depth measurements of keypoints in two dimensional images of ears. For example, the key surface feature depth predictor is a machine learning algorithm trained by being fed with two dimensional images of ears on which keypoints are labelled, and using corresponding physical measurements of the depth of the respective keypoints as ground truths (or some other physical measurement of the depth of each keypoint). The machine learning algorithm predicts a depth measurement of each keypoint in the two-dimensional image, with a loss function that aggregates across the keypoints a difference between the physically measured depth of the keypoint and the predicted depth of the same keypoint. Thus, the training data is two-dimensional images of ears with identified keypoints, and the ground truth is physical depth measurements for the identified keypoints. The keypoints are the key surface features.

It is noted that the discussion above relates to using a key surface feature depth predictor to predict the depth of the key surface features in order to speed up the obtaining of the relative orientation of the ear to the handheld imaging apparatus. Thus, the key surface feature depth predictor may be used in place of a physical depth detector either to speed up processing, or because there is no physical depth detector in the handheld imaging apparatus. In case there is a physical depth detector in the handheld imaging apparatus, the handheld imagining apparatus may be utilized to obtain the 3D scans of the ear from the targets. The depth map predictor is used to determine a relative 3D orientation of the imaging lens to the ear. The depth map predictor incurs a process cost insofar as it runs a machine learning algorithm to predict the depth of each key surface feature, but is fast to execute since it processes two dimensional data. The higher accuracy provided by the physical depth detector is leveraged once a target is met and so the handheld imaging apparatus is at the correct relative orientation and position to 3D scan the ear.

Alternatively, the principle of the key surface feature depth predictor may be extended to the entire ear. That is, an ear depth map predictor may be trained to predict depth measurements for each pixel within a two dimensional image of an ear. The ear depth map predictor is a machine learning algorithm. The training data is two-dimensional images of ears, with the ground truth being corresponding depth maps of the ears obtained by a physical depth measurement device. It can be appreciated that ears have relatively constrained geometries and that therefore it is possible to a certain level of accuracy to predict depth based on a two dimensional image of an ear. In such embodiments, the ear depth map predictor is trained to minimize a loss function calculated based on an aggregated (across all pixels of the ear in the image of the ear) difference between the predicted depth and the measured depth per pixel. The 3D scan of the ear obtained from the target position is acquired by acquiring a two dimensional image via the imaging lens, and feeding forward the two dimensional image into the trained depth map predictor, and combining the predicted depth map with the two dimensional image to acquire the 3D scan.

The coordinates (i.e. the detected positions of the key surface features in the image, and/or the placements of the detected key surface features in three dimensions) are already in the frame of reference of the imaging lens, and therefore the plane is defined relative to the imaging lens. The coordinates are not absolute coordinates in a fixed spatial frame of reference, but are coordinates within an image and/or depth field obtained by the handheld imaging device. Fitting to a fixed frame of reference (such as a room, building, geographical feature) etc is not necessary, since the method relates to guiding a subject 50 to achieve predetermined target relative orientations and positions of ear to imaging lens.

Communication Between Local Processing Apparatus and Web Server

At S105 information is output from the local processing apparatus 20 to a web server 10. The local processing apparatus 20 is connectable to the internet via a wired or wireless connection. There may be one or more intermediate devices on the communication path from the local processing apparatus 20 to the web server 10.

Embodiments may function by the local processing apparatus 20 connecting to the web page through an intermediate messaging server 10. An exemplary interface for the connection is the AWS IoT APIs via the AWS SDK for iOS, which is directed to an intermediary server 10 located in one of multiple places around the world (as explained below, embodiments may choose the closest intermediary server to the subject location). Once the method is initialized and the relative position and orientation data is obtained for a first frame at S104, the relative position and orientation information (optionally along with additional data such as targets) is streamed to the intermediary server 10 (exemplary of the web server 10) and when a subject connects via a web app, the server 10 distributes this information for visualization. It should be noted that this process is not limited to being implemented on AWS, and could be performed via a proprietary custom configured intermediate messaging server.

In addition to the dynamic image rendering the determined relative 3D orientation and determined relative 3D position (of the handheld imaging device relative to the ear), the web page may render a representation of the ear along with, for example, a head and/or other body parts of the subject. The representation may be a 3D avatar in the shape of a human and stored at the web server for rendering, or may be from a live stream of image extracted from the series of images obtained by the handheld imaging device.

The local processing apparatus may be configured to (initially and with periodic repetition) measure the bandwidth of the data upload connection from the local processing apparatus to the web server, to determine whether or not there is sufficient bandwidth to upload the live stream of images. If it is determined that there is sufficient bandwidth, then a further determination may be performed to determine whether and how to reduce the amount of data from the stream of images obtained by the handheld imaging apparatus to the live stream for output (i.e. upload) to the web server. Reduction may be achieved by one or more from among: reducing a frequency of the images so that only 1 in every n images from the stream obtained by the handheld imaging apparatus is included in the live stream, and reducing resolution of the images.

At the web server, an avatar may be used in place of live stream when no live stream is received from the local processing apparatus. The avatar is a generic 3D model of a human rendered in 2 dimensions for display on the web page underneath the dynamic image.

An ear of the avatar or an ear of the subject as represented in the live stream is located and oriented at a predefined position (i.e. centrally in the rendered image) and orientation (i.e. with the plane of the ear parallel to or perpendicular with a plane of the display screen), which defines a placement of the elements of the dynamic image: the targets at their respective target relative 3D position and target relative 3D orientation; and a representation of the handheld imaging device at the determined relative 3D position and determined relative 3D position of the handheld imaging device. Web page may provide functionality to rotate or rescale the rendered image. The rendered image comprises the dynamic image overlaid on either the avatar (and a pre-defined background) or the live stream.

Alternatively, the handheld imaging device is located and oriented at a predefined position (i.e. centrally in the rendered image) and orientation (i.e. with the display screen of the handheld imaging device aligned with a plane of the rendered image), which defines a placement of the elements of the dynamic image: the targets at their respective target relative 3D position and target relative 3D orientation; and a representation of the subject either in the form of the avatar or in the live stream at the determined relative 3D position and determined relative 3D position of the ear relative to the handheld imaging device. Web page may provide functionality to rotate or rescale the rendered image. The rendered image comprises the dynamic image overlaid on either the avatar (and a pre-defined background) or the live stream.

Geographic Selection of Web Server

The web server 10 may be pre-selected for the subject 50 based on geographic location of the subject 50. For example, a service provider (i.e. entity responsible for the web server steps) may have access to plural web servers at different geographic locations. In a preprocessing step (i.e. before S101) a subject 50 may register for an ear 3D scanning guidance service provided by the service provider (such registration may be via a third party seeking to provide a customized ear-based device to the subject 50), and in doing so may indicate a geographic location (for example, a country in which the subject 50 expects to be situated during ear scanning). Based on the indication, the service provider may determine a geographically closest to the subject 50 from among the plural web servers, or may otherwise determine a web server 10 from among the plural web servers with fastest ping speed to the subject 50 (wherein subject 50 is shorthand for subject local processing apparatus 20), for example via an installable application. Based on a result of the determination, a unique access code may be generated for the subject 50 by the service provider, the unique access code embedding an identifier for the determined web server 10 so that upon initiating the ear 3D scanning guidance service session (i.e. the method of FIG. 1), the subject 50 is requested so submit the unique access code to whichever web server is hosting the initiation. The submission of the unique code by the subject 50 serves as a code that accompanies uploaded information from local processing apparatus 20 to the server, and governs access to the dynamic image rendered by the web server 10 based on the uploaded information. In addition, the code determines to which of the web servers the information is upload and thus by which of the web servers the dynamic image is generated. As an alternative, the unique code may embed geographic information (rather than determination of web server 10) and the allocation of web server 10 to the session is determined upon initiation using the geographic information from the code and the geographic information of the available web servers (to minimize distance or minimize ping time).

Rate of Information Transfer

At S105 the web server 10 receives, from the local processing apparatus 20, a determined relative orientation of the imaging lens to the ear, and a determined relative position of the imaging lens to the ear. The information is received once per frame for each frame of the captured stream. In the case of a captured video stream at 30 fps, the web server 10 receives instances of the determined relative orientation and position 30 times per second.

A video streaming service such as the Amazon Kenesis® video streaming service may be used to transfer images from the handheld imaging apparatus to the web server.

Rendering Dynamic Image

At S106 the web server 10 renders a dynamic image comprising the ear, the handheld imaging apparatus 30, and one or more targets. For example, the image is re-rendered for each received instance of received information from the local processing apparatus 20, and since the received information may change from one instance to the next, the image is considered to be dynamic. In reality, the dynamic image is a series of still images. The dynamic image is a two-dimensional image insofar as it is viewed on a two-dimensional display unit. The dynamic image is a representation of a three-dimensional scene, and thereby may be stored as 3D data. For example, the web server 10 stores a notional 3D workspace populated by a representation of the subject ear, a representation of the handheld imaging device, and one or more targets. The 3D workspace is rendered in 2D.

The web server 10 may render plural images of the 3D workspace, each image being a view from a different viewpoint.

The notional 3D workspace is populated by 3D data manifestations of the avatar (being at least an ear, and optionally a head including an ear), one or more targets, and the handheld imaging device. The 3D data manifestations may be meshes, for example, composed of vertices and faces. No video content is streamed or rendered. When the next repetition of the information from the local processing apparatus is received at S105 the most recently received determined relative orientation and position are used to update the position and orientation of the 3D data manifestations of the handheld imaging device 10 and the one or more targets. The avatar may be fixed, which facilitates comprehension of the rendered workspace by the subject.

Figure 4:
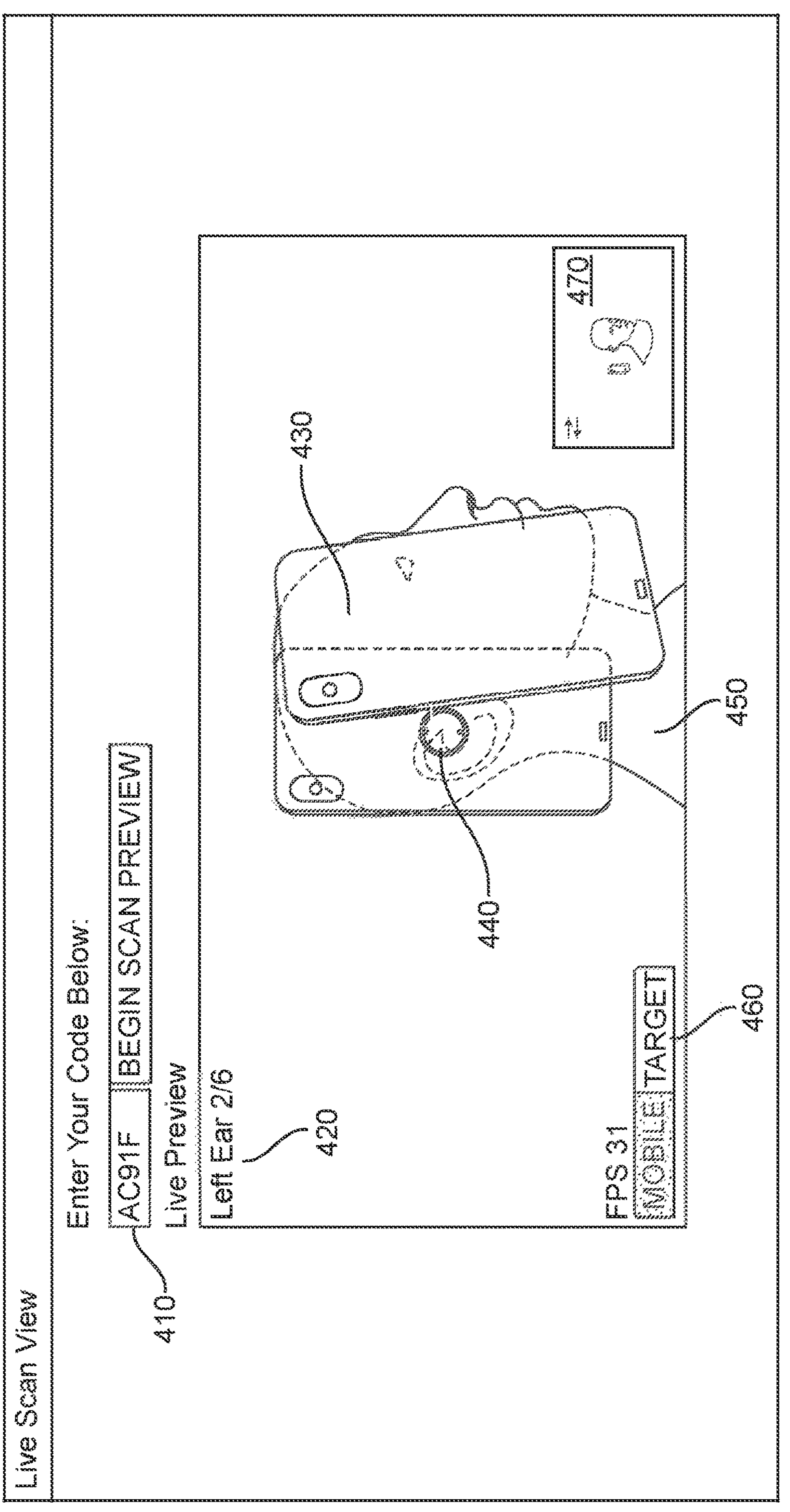
FIG. 4 is a screenshot from a web page in an embodiment.

FIG. 4 illustrates a screenshot from an instance of a web page rendering the dynamic image. The screenshot is of the interface that would be displayed, for example, on the web-enabled device 40. A field 410 enables the subject to enter a unique code that identifies the subject to the web server and is the same code associated with the stream of images being upload to the web server by the local processing apparatus 20. It is effectively a session identifier and/or access token. A progress indicator 420 identifies which of the subject's ears is being scanned, and which target is being rendered (the screenshot is from an implementation in which only a single target is rendered at a time). The target being rendered is the next target from which the ear is to be scanned. The avatar 450 is a head with the ear being scanned turned toward the viewpoint. The target 440 is represented by a ring, which is overlaid by a representation of a handheld imaging device. A toggle button 460 enables the representation of the target in the dynamic image to be switched between the ring with the overlay of the handheld imaging device, or a target shape such as a torus. A corresponding shape is used to illustrate the handheld imaging apparatus 430. The dynamic image shows the relative orientation of the handheld imaging apparatus 430 to the avatar 450 and the target 440. The avatar 450 is in a fixed position in the 3D workspace for all scanning of the ear (i.e. for all six targets). The target 440 is in a fixed position in the 3D workspace until a 3D scan is acquired from the target that meets the target completion condition, and a next target is rendered in place of the target. Alternatively, the position and orientation of the avatar in the dynamic image may be altered according to the target. The representation of the handheld imaging apparatus 430 changes from frame to frame of the dynamic image according to the relative orientation and position uploaded to the web server at S105. An auxiliary view 470 provides a view of the same 3D workspace from a different viewpoint. A selector enables a user to scroll through different viewpoints for the auxiliary view 470. A color selected to render the representation of the handheld imaging apparatus may be dependent upon an imaging condition being satisfied (noting that the imaging condition is the handheld imaging apparatus being within an acceptable range of the target position and orientation). In FIG. 4, the handheld imaging apparatus 430 is not precisely at the target 440, but may be within an acceptable range to satisfy the imaging condition so that a 3D scan can be acquired, and thus is rendered green.

Figure 5:
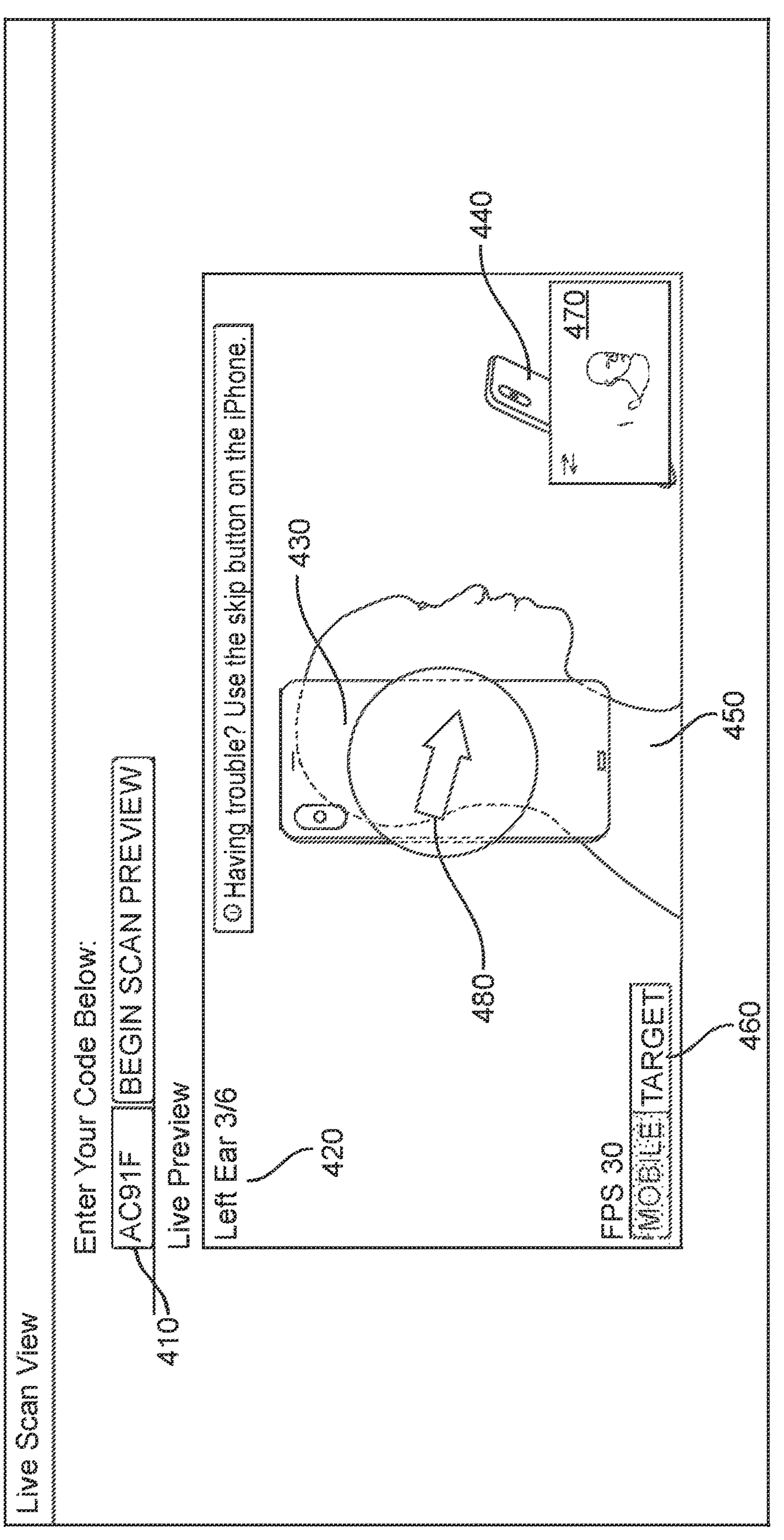
FIG. 5 is a screenshot from a web page in an embodiment.

In FIG. 5, the target 2/6 has been completed and a new target 3/6 is rendered. The avatar 450 has been rotated slightly toward the new target 440. In addition, an indicator 480 is included in the dynamic image to guide a user toward the target 440. A color selected to render the target 440 and the handheld imaging apparatus 430 in FIG. 5 is different than in FIG. 4, since the imaging condition associated with the target 3/6 is not satisfied by the current position and orientation of the handheld imaging apparatus 430. Additional information, such as a frame rate, may be included in the web page.

Avatar

The dynamic image comprises a representation of the subject ear (for example as an avatar), a representation of the handheld imaging apparatus, and one or more targets. The determined relative orientation of the subject ear to the imaging lens is represented by the relative placements of the representations of the handheld imaging apparatus and the representation of the ear within a notional three dimensional workspace. The rendered image is two-dimensional but may use perspective to represent three dimensional spatial information.

In embodiments, the orientation and position of the ear in the rendered image may be fixed in the dynamic image, so that relative orientation of imaging lens to ear and relative position of imaging lens to ear are represented in the dynamic image by movement and rotation of the representation of the handheld imaging apparatus.

The avatar may be an avatar of an entire head, on which the subject ear may be highlighted. The avatar may be generic or individualized for the subject.

The avatar may be stored at the web server 10 within the web app as 3D data (vertices and faces). When a web-enabled device 40 connects to the web app the dynamic image including the avatar is displayed on the two-dimensional display unit of the web-enabled device using, for example, JavaScript 3D graphics libraries. All display information may be handled within the web app. The avatar, and optionally also the targets, are stored at the server-side and handled within the web app, so that the information output by the local processing apparatus 20 to the web server 10 at S105 may be only the relative orientation and position information.

The dynamic image also illustrates the handheld imaging device, and specifically the position and relative orientation of the handheld imaging device relative to the subject ear. The illustration of the handheld imaging device is not necessarily to scale, and is a three-dimensional shape within the notional 3D workspace enabling orientation to be determined in the 2D dynamic image.

Accessing Web Page

The web-enabled device 40 accesses the web page on which the rendered image is displayed. The web-enabled device 40 may be required to transmit the unique code to the web server 10 in order to gain access to the web page and view the dynamic image. The subject 50 can view the dynamic image on the web-enabled device 40 and thereby is provided with visual feedback on the relative position and relative orientation of the handheld imaging apparatus 30 to their ear. It is assumed that the subject 50 holds the handheld imaging apparatus 30 themselves. Since embodiments also render one or more targets in the dynamic image, the subject 50 can determine, by viewing the dynamic image on the web-enabled device 40, how to move the handheld imaging apparatus 30 to the target relative orientation and position and thereby to acquire a 3D scan of their ear from the target relative orientation and position.

Targets

The targets can be managed in a number of different ways, and there are a number of different aspects to managing the targets.

Each target is a predetermined relative orientation and position of the imaging lens to the ear. A first aspect of managing the targets is target selection. The target selection is somewhat dependent upon the purpose of the 3D ear scanning. Typically, a third party (also referred to as custom product provider) may wish to provide a custom product to a subject 50 that fits into or around the ear. Alternatively the third party may be a medical services entity requiring a 3D model of the subject ear for the purposes of planning or executing a medical procedure or operation. The third party therefore requires a 3D model of all or part of the subject ear, and utilizes the service provider to interact with the subject to guide the subject 50 to utilize their own handheld imaging apparatus 30 to obtain plural 3D scans of their own ear from different angles and positions, which plural 3D scans the service provider combines into a 3D model. The service provider may provide a generic service so that the different angles and positions are consistent for all subjects regardless of application (i.e. regardless of the product or medical application being scanned for); in this case, the targets are generic and the target selection is simply the same generic set of targets for every subject 50. Alternatively, the service provider may customize the service depending on the application, with targets defined in order to provide a high level of detail of a specific part of the ear or of the whole ear. Therefore, the number and position/orientation of the targets may be tailored by the service provider for the particular application for which the ear is being scanned.

Controlling Level of Detail Via Target Selection and Target Completion Condition It is noted that a further related degree of freedom in this regard is the target completion condition, wherein third parties may indicate a detail level required in the scan, and the service provider may tailor the target completion condition accordingly, so that a target is only considered satisfied when a 3D scan meeting selectable (according to detail level required) conditions is acquired from the target position & orientation.

In selecting number of targets, position & orientation of targets, and/or target completion conditions, the service provider and the third party are balancing a desire to obtain an accurate 3D model of the subject ear with inconvenience to the user in obtaining the 3D scans.

Determining Which Targets to Render

Once the targets are determined, a second aspect of managing the targets is determining which target(s) to render in each frame of the dynamic image. Each target may have a status in the target registry. The status may have two components: a first component being completed or to-be-completed, and a second component being rendered or non-rendered. Depending on the implementation, embodiments may be configured without a rendered status for completed targets (i.e. completed targets are always made invisible). Whether a target is rendered or non-rendered determines whether or not it is included in the dynamic image at S106. The web server 10 at least requires knowledge of which targets to render. In addition, whether a target is rendered & completed, or rendered & to-be-completed, determines how it will be rendered by the web server 10. For example, a different motif or a different color may be used for completed than to-be-completed targets.

Embodiments may store the target registry at the web server 10 and a selection of which of the targets to render in each frame of the dynamic image is made by the web server 10, or the web server 10 may receive target location(s) & orientation(s) from the local processing apparatus 20 (which may itself store the target registry), so that, for example, the local processing apparatus 20 may include one or more targets (i.e. target relative position & orientation of ear to imaging lens) to render in the information transmitted at S105. Alternatively embodiments may implement a registry at both sides, whereby the web server 10 stores for each target at least an identifier, a status, a relative orientation (of imaging lens to ear), and a relative position (of imaging lens to ear). The information transmitted by the local processing apparatus 20 at S105 may then comprise only an identifier of a next target, or may comprise identifiers of all selected targets for the instance of the method, or a subset thereof.

Screenshots illustrating rendering of targets are shown in FIGS. 9A to 9D.

For example, the targets may be rendered as tubes or pipes wherein when the relative orientation and relative position of the handheld imaging apparatus to the ear is the target relative orientation and target position, in the rendered image the tube aligns with the ear such that the ear is visible through the tube. For example, the tube may be squat (i.e. length shorter than diameter) wherein when the phone is aligned with the central axis of the tube in the rendered image the ear is visible through the tube.

Figures 9A, 9B:
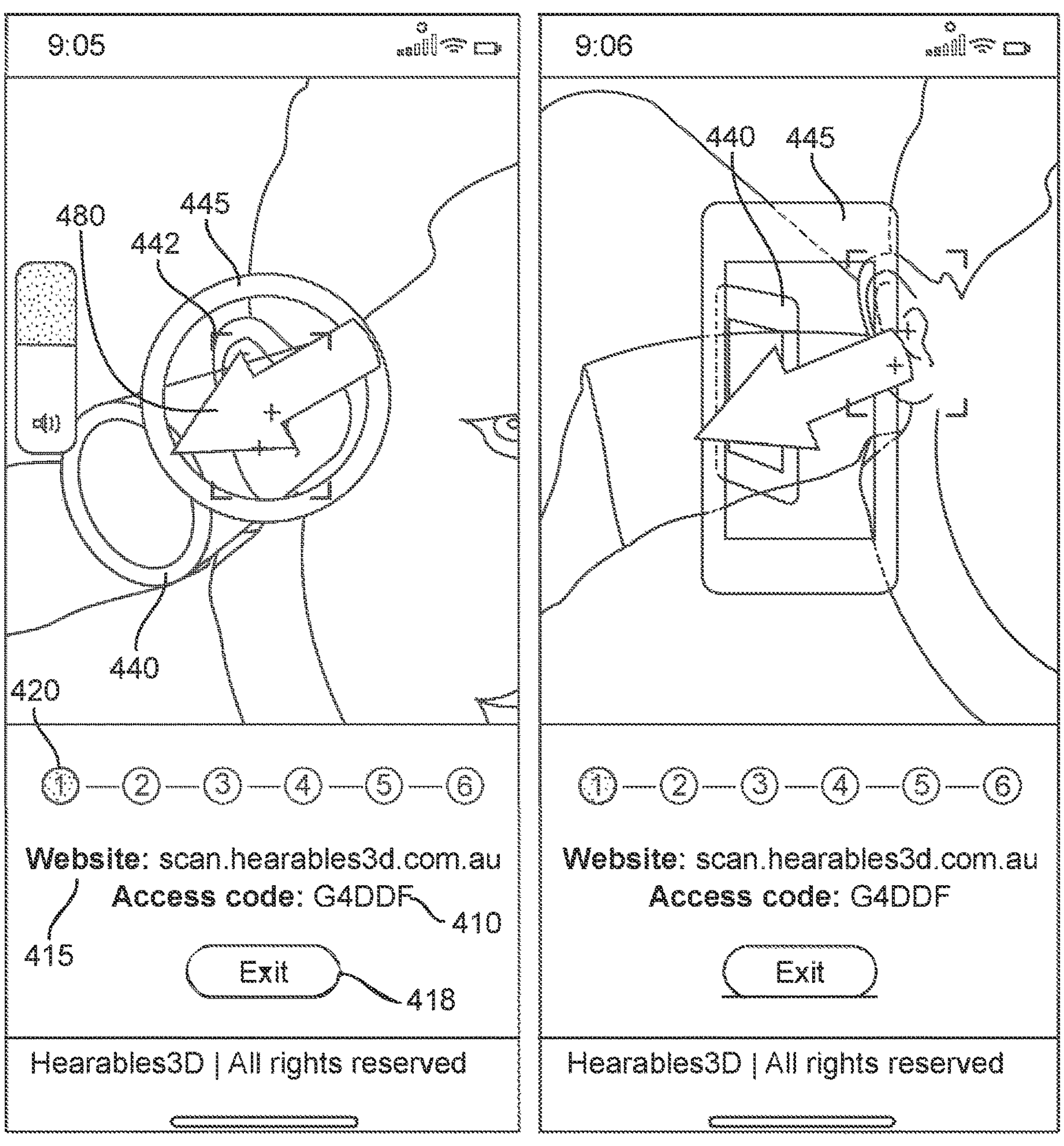
FIGS. 9A to 9D illustrate screenshots of a web app of an embodiment.

FIG. 9A illustrates a screenshot from a web-application displaying the web page served by the web server. In the example of FIG. 9A a bandwidth sufficient to video stream from the handheld imaging apparatus to the web server is available and so the live video stream from the handheld imaging device is rendered on the web page instead of an avatar. The web page may be accessed by a generic web browser application or by an application dedicated to the ear scanning function and which also manages functions such as access and security.

FIG. 9A illustrates the web page which includes a dynamic image composed of the live video stream augmented with a target 440 in the form of a tube, an indicator 480 to guide the user to the correct position of the handheld imaging apparatus to satisfy the present target (which is itself indicated by progress indicator 420 which is outside of the dynamic image but still part of the web page). A representation of present/current/live handheld imaging apparatus position and orientation 445 is in the form of a ring. The user is aiming to position and orientate the handheld imaging apparatus such that the live representation 445 is coincident with the target 440, specifically with the tube end distal from the subject ear. Field 410 details the access code for ease of reference, and field 415 details a URL of the web page for ease of reference. A button 418 enables a user to exit scanning mode of the web application and return to a menu, title, or holding page. As illustrated by FIG. 9A, the web server may render the augmentations including one or more from among: the indicator 480, the live representation 445, and the target 440, in partially transparent form, such that one or more is visible through another. In this manner, a user is able to resolve the individual augmentations from one another even when two or even three happen to have one or more coincident pixels. Optionally, the subject ear is framed. In the case of FIG. 9A, a frame 442 is defined by four corner icons located such that they define or imply a frame around the subject ear.

FIG. 9B is equivalent to FIG. 9A but utilizes different geometries for the augmentations onto the live video stream images. In particular, the representation of present/current/live handheld imaging apparatus position and orientation 445 is in the form of a rectangular frame. Similarly, the target 440 is in the form of a rectangular frame. The user is aiming to position and orientate the handheld imaging apparatus such that the live representation 445 is coincident with the target 440.

Figures 9C, 9D:
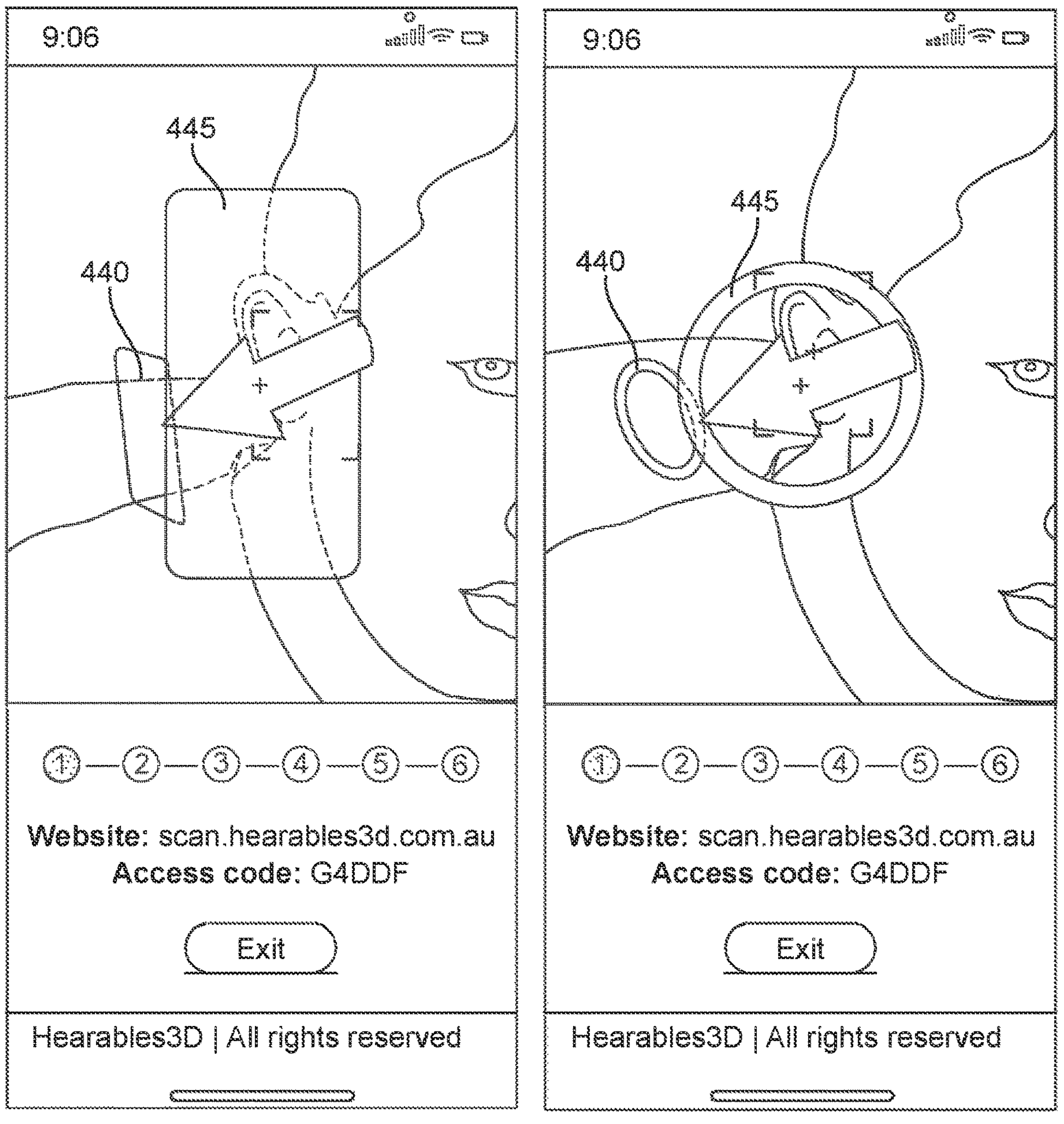

FIG. 9C is equivalent to FIG. 9B but utilizes different geometries for the augmentations onto the live video stream images. In particular, the representation of present/current/live handheld imaging apparatus position and orientation 445 is in the form of a rectangle. Similarly, the target 440 is in the form of a rectangle. The user is aiming to position and orientate the handheld imaging apparatus such that the live representation 445 is coincident with the target 440.

FIG. 9D is equivalent to FIG. 9A but utilizes different geometries for the augmentations onto the live video stream images. In particular, the representation of present/current/live handheld imaging apparatus position and orientation 445 is in the form of a ring. Similarly, the target 440 is in the form of a ring. The user is aiming to position and orientate the handheld imaging apparatus such that the live representation 445 is coincident with the target 440.

It is noted in each of FIGS. 9A to 9D that the web server utilizes distinct colors to render the indicator 480, the target 440, and the live representation 445.

Managing Targets

A target registry may be stored at the server-side, at the local processing apparatus 20 side, or may be partially stored at each side (with some information duplicated).

Managing Targets

Depending on the application, the targets may be rendered serially one-at-a-time in a predetermined order, or all targets may be rendered simultaneously, or the targets may be grouped and each group rendered simultaneously with the groups rendered serially. A further variable in the second aspect is whether and how to render completed targets to distinguish them from to-be-completed targets. The target registry may include an entry per target with a status indicating whether the target is completed or to-be-completed, with all being set to to-be-completed at initiation of the method. The status may further indicate whether or not a target is rendered or non-rendered, which may be used by the web server 10 in determining whether and how to render the respective target in the image.

Embodiments may be configured to only render a next target to be completed, so that the targets are rendered one at a time in the dynamic image. The target registry status of a next target to be completed is not completed & rendered. The target registry status of any targets that have been completed is completed & non-rendered. The target registry status of targets that have not yet been completed and are not the next target is to-be-completed & non-rendered.

Embodiments may be configured to render all targets simultaneously. The target registry status of all target is rendered & either completed or to-be-completed, in dependence upon whether the target completion condition for the respective target is satisfied. The mode of the rendering may be dependent upon whether the status is rendered & completed or rendered & to-be-completed. For example, a different color could be used for each, or a different shape or motif.

Embodiments may be configured to render to-be-completed targets only. The target registry status does not necessarily need to have two elements in such embodiments, since there are only two different statuses: 1. rendered & to-be-completed, and 2. non-rendered & completed.

The motif or shape used to represent the target(s) in the dynamic image may be the same motif or shape used to represent the handheld imaging device, so that the subject can easily ascertain how to modify the relative orientation of the handheld imaging device in the physical domain to find the target(s) and satisfy the imaging condition, and consequently the target completion condition, for the respective target.

Figure 3:
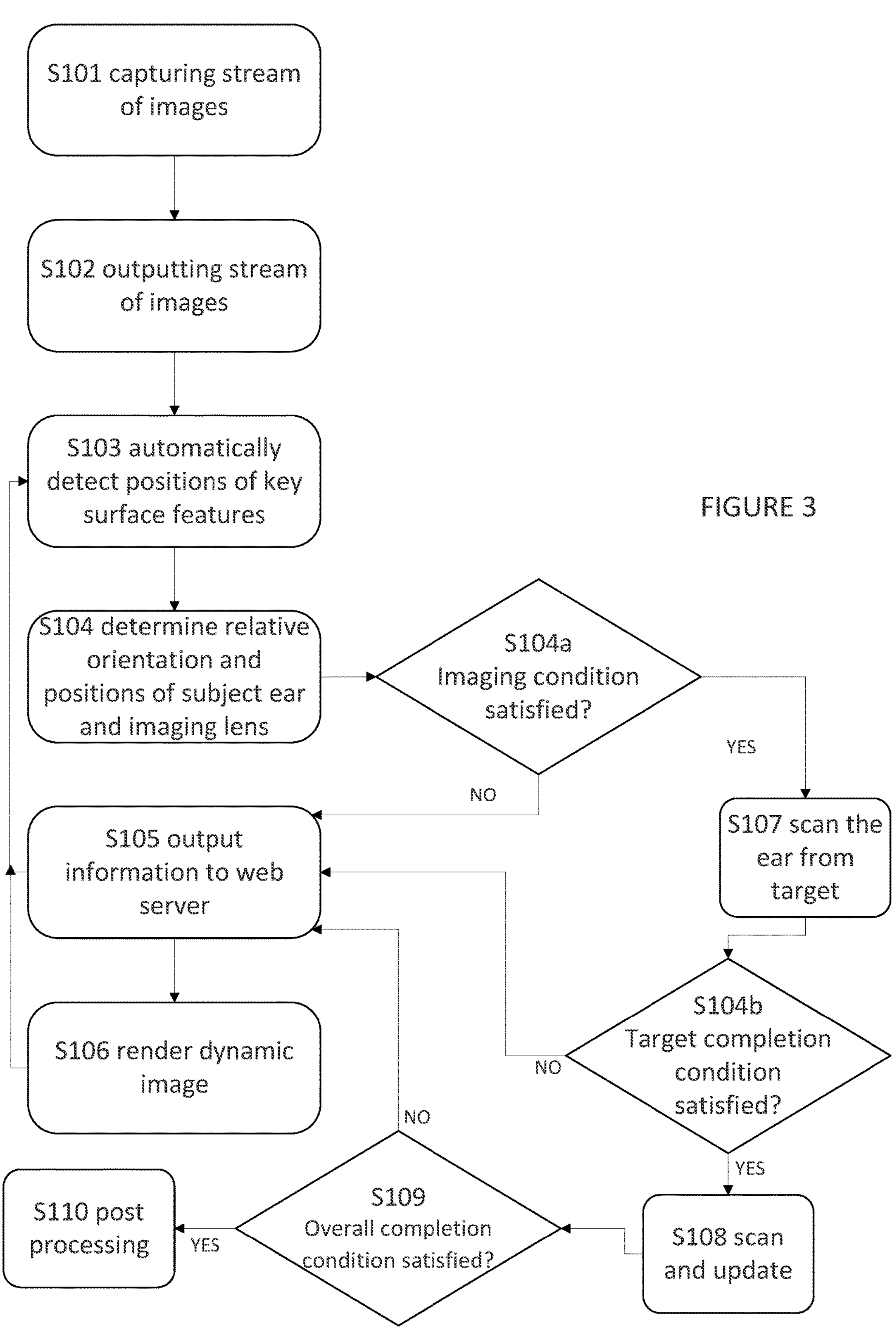
FIG. 3 illustrates a processing flow in an embodiment.

FIG. 3 illustrates an example of the method of FIG. 1. In particular, FIG. 3 illustrates a processing flow in which two conditions are defined per target. A first condition is an imaging condition S104*a*. The imaging condition determines an extent of match between the target relative position & orientation (of ear to imaging lens) and the determined relative position & orientation (of ear to imaging lens) required to trigger the handheld imaging apparatus 30 to acquire a 3D scan for storing and subsequent compilation of the 3D model of the subject ear. The imaging condition may include a target relative orientation given in degrees, and may be different for yaw, pitch, and/or roll (or two thereof), and may be different per target. The imaging condition may include a target relative position given in distance or given as a measure of centrality and size of the ear within the image, for example all eight detected key surface features within the image, or within the central X % of the image, or a line between two of the key surface features is more than a threshold number of pixels, for example. That is, the relative orientation at least partially determines which regions of the ear are visible and which are obscured by other regions of the ear. Hence, selection of target orientation is at least partially determined by for which regions of the ear the third party requires 3D modelling and to what level of detail.

Once the target relative orientations are determined, the respective accompanying target relative positions may be determined by the position at which the whole ear or a particular part of the ear is within the field of view at the particular orientation. With this in mind, the imaging condition may be that the target orientation is met (to within a threshold tolerance) and that all, a particular number, or a particular subset of the key surface features are in the field of view. In addition, a minimum distance between one or more pairs of the surface features may be included in the imaging condition, to ensure that the ear occupies a desired number of pixels.

Determination of whether or not the imaging condition is satisfied may be performed by the local processing apparatus 20 based on the to-be-completed targets (or a particular to-be-completed target, for example a target flagged or otherwise identified as next target in the registry, indicating that the target is the only target to be rendered and thus the only target for which the imaging condition can be satisfied) and the determined relative orientation & position. The local processing apparatus 20 is configured to cause the handheld imaging device to obtain a 3D scan on condition of the imaging condition being satisfied.

The web app may communicate some or all of a target registry to the local processing apparatus 20 to enable the local processing apparatus 20 to determine at S104*a* when an imaging condition is met for a rendered target.

It is assumed that the imaging condition can only be satisfied for rendered targets. So the local processing apparatus 20, for example via its target registry, has a rendered or non-rendered status for each target. The local processing apparatus 20 compares the determined relative orientation and position with each target for which the status is rendered and to-be-completed, and if any are satisfied, causes the handheld imaging apparatus 30 to obtain a 3D scan at S107. If the 3D scan satisfies the target completion condition for the respective target, the status is updated to completed.

Determination of whether the imaging completion is satisfied at S104*a* does not influence whether or not steps S105 to S106 are performed. Steps S105 & S106 are performed regardless of whether the imaging condition is satisfied. If the imaging condition is satisfied, the flow proceeds to S104*b*. If the imaging condition is not satisfied, the flow proceeds to S105 the first processing step of a next image in the stream is S103 the automatic detection of key surface features. Of course, as stated elsewhere, the local processing apparatus 20 may process the images in a multi-threaded environment so that processing of image n+1 is being performed whilst image n is still being processed. However, the link between S105 and S103 is intended to represent the continuation of processing at the local processing apparatus 20.

FIG. 3 illustrates flow proceeding from S105 to S106 and S103. In the processing thread for a particular frame, S106 follows S105, and the server renders the dynamic image with the new information from S105.

Managing Targets: Target Completion Condition

A second condition per target may be the target completion condition S104*b*. The target completion condition S104*b* may be the same for each target or may be defined differently for each target or for subsets within the plurality of targets. When the imaging condition S104*a* is met for a particular target, the handheld imaging apparatus 30 is caused at S107 to acquire a 3D scan of the field of view. Depending on the hardware arrangement, the 3D scan may be a two dimensional image obtained via the imaging lens and a depth map obtained via a depth detection apparatus, which may include the imaging lens and an auxiliary lens. The depth map measures a distance from the imaging lens of each point in the field of view (wherein a point in this sense is a surface, surface interface, or light artefact represented by a pixel in the two-dimensional image). The target completion condition S104*b* may be simply that a 3D scan of the ear is acquired from the target orientation and position, so that the target completion condition is satisfied upon acquisition of the 3D scan. The target completion condition may include a threshold value of an image quality characteristic, such as blur, noise, contrast, or distortion. For example, if the level of blur in the 3D scan exceeds a threshold, then the target completion condition is not satisfied, and the 3D scan must be re-taken (if the imaging condition is still satisfied). Optionally, embodiments may automatically modify one or more image parameters of the handheld imaging device in response to the target completion condition not being satisfied. For example, if the level of blur was too high, the ISO may be increased.

If the target completion condition is satisfied the flow proceeds to S108, then the status of the target is updated to completed in the target registry. Upon completion, rendering of the target in the dynamic image may change, so that either the target is no longer rendered, or so that the target is distinguishable as a completed target from the to-be-completed targets. Step S108, store and update, may include updating the target registry and/or the dynamic image to indicate that the target is complete, and storing, either locally on the local processing apparatus 20, on a connected post-processing server, or on both, a copy of the scan from the target satisfying the target completion condition. The flow proceeds to S109, and conditionally on to S105, or the method ends.

The information transmitted at S105 to the web server 10 by the local processing apparatus 20 per frame may include information indicating which targets to render and whether those targets are completed or to-be-completed. Alternatively, in embodiments in which a target registry at the web server side stores status information, the information transmitted at S105 may include updates to the target registry. For example, targetXstatus=completed, or targetYstatus=rendered.

Output and Post-Processing

Embodiments may store an overall completion condition S109 to be satisfied, in order for the method (i.e. the per-frame repetition of steps S101 to S107) to be considered complete. The overall completion condition may be that all target completion conditions are satisfied, or that target completion conditions for a particular proportion of the targets are satisfied, or a combination of those approaches. For example, in the combination there may be essential targets and optional targets, and the overall completion condition may be that all essential targets are satisfied and a predetermined proportion of the optional targets are satisfied.

At satisfaction of the overall completion condition S109, the local processing apparatus 20 has acquired 3D scans of the subject ear from all targets, or from a particular subset thereof. The acquired 3D scans provide a data representation of the subject ear that may be used by a third party such as a medical services provider or a custom product manufacturer in providing a customized service to the subject.

Depending on the specific customized service, embodiments may include one or more post processing steps S110 at a post-processing server, at the local processing apparatus 20, or at both a post-processing server and the local processing apparatus 20. Step S110 may further include ending the method of FIG. 1 so that the capturing of the stream of images by the handheld processing apparatus ends. The web page may replace the dynamic image with a message indicating that scanning of the subject ear is complete. In some embodiments, the subject may be asked to select whether to end the session or to scan their other ear, in which case the method is performed again for the other ear.

If at S109 it is determined that the overall completion condition is not satisfied, the flow proceeds to S105 and the process of capturing and processing images continues.

Post processing S110 may include stitching the separately acquired 3D scans together into a single composite 3D scan of the subject ear. Post processing S110 may include a method, program, or apparatus as disclosed in WO2019/104397, which discloses techniques for producing a product design customized for a selected environment taking a new 3D scan as input, in which context the single composite 3D scan is the new 3D scan. The 3D scans acquired from the individual targets may be referred to as local scans, and the single composite 3D scan may be referred to as a global scan or global model.

For example, the separately acquired 3D scans may be uploaded to a post-processing server along with data identifying the relative position and orientation of handheld imaging apparatus to ear at which the respective 3D scans were obtained. These scans are processed into a 3D model, for example, using a process such as Truncated Signed Distance Function. This process creates a volume and using each depth frame creates a 3D model by overlapping and weighting each depth point. An exemplary library is available from open3D.

The post-processing server may be the web server 10, may be operated by the same entity as the web server 10, or may be separate from the web server 10.

The local processing apparatus 20 stores the separately acquired 3D scans satisfying the respective target completion conditions. Step S110 may comprise simply transmitting the separately acquired 3D scans to a post-processing server. Step S110 may also include one or more steps to end the method, such as terminating the connection to the web server 10 (i.e. ending the web app session) and/or terminating the capturing of images.

Figure 6:
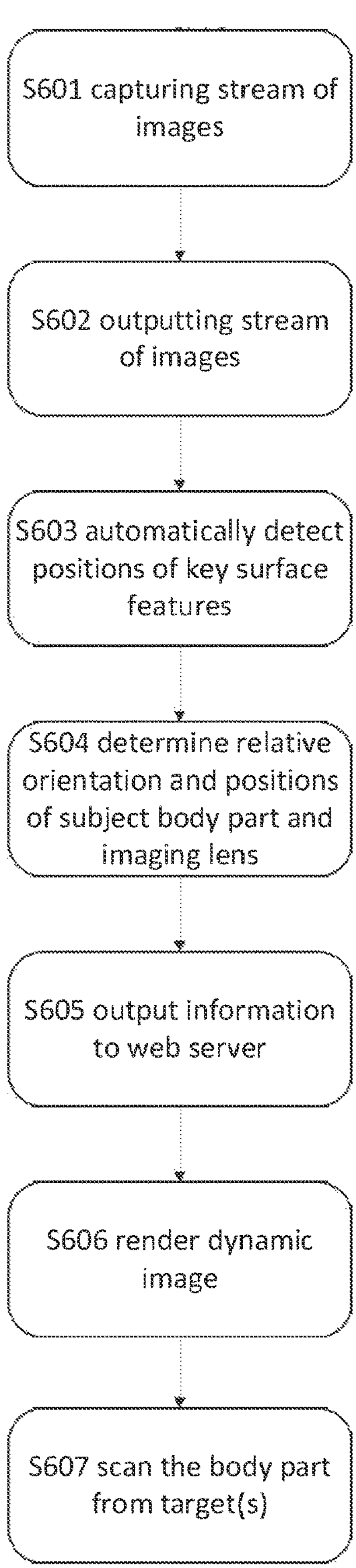
FIG. 6 is a flowchart of a method of an embodiment.

FIGS. 6 & 7 illustrate a flow of processing in methods performed with respect to a body part, not necessarily an ear. Methods may be executed on a body part other than an ear. For example, a nose, a face, a hand, a foot, a head, or an ankle, are examples of body parts with geometries suitable for scanning via methods detailed herein. At the design stage an expert analyses images of many instances of the body part from different subjects in order to identify a plurality of key surface features (e.g. two, four, eight, ten, or fifty key surface features) that a machine learning algorithm is trained to locate within a two-dimensional or three-dimensional image in order to establish a relative orientation and position in three dimensions of the handheld imaging apparatus and the body part. The body part is externally visible.

Process steps S6XX are as disclosed above in the disclosure relating to FIGS. 1 to 3, with like process steps assigned the same XX suffix so that S1XX corresponds to S6XX, noting that ear is replaced by body part.

A method comprises: at a handheld imaging apparatus, capturing a stream of images via an imaging lens and outputting the stream to a local processing apparatus, the images imaging a field of view including a body part of a subject. The method comprises, at the local processing apparatus: receiving the stream of images, and, on a repetitive basis per image: automatically detecting a position of each of a plurality of key surface features on the body part within the image to determine a relative 3D orientation of the imaging lens to the body part; based on the determined relative orientation and positions of the key surface features within the frame, determining a relative 3D position of the imaging lens to the body part; outputting, to the web server, the determined relative 3D orientation and the determined relative 3D position. The method further comprises, at the web server: hosting a web page comprising a dynamic image rendering: the determined relative 3D orientation and the determined relative 3D position; one or more targets, each target being a target relative 3D orientation and target relative 3D position of the imaging lens to the body part. The rendering includes periodically updating the dynamic image to illustrate the most recently received determined relative 3D orientation and determined relative 3D position. The method further comprises: at the handheld imaging apparatus, acquiring a 3D scan of the subject body part from the one or more targets.

Optionally, the method further comprises: at a web-enabled device having a display unit (and being visible to the subject), accessing the web page and displaying the dynamic image. Advantageously, the feedback loop from handheld imaging apparatus, to web server, and back to subject, is complete.

Optionally, the method further comprises: at the local processing apparatus, on a repetitive basis per image among the two-dimensional images, determining whether or not an imaging condition is satisfied for the one or more targets in the dynamic image, the imaging condition being that the most recently determined relative 3D orientation and the determined relative 3D position are within a predefined range of the target relative 3D orientation and the target relative 3D position of one of the one or more targets; and if the imaging condition is satisfied, causing the handheld imaging device to acquire a 3D scan of the subject body part from the target. The imaging condition determines when the handheld imaging apparatus is in a position and orientation at which to acquire a 3D scan of the subject body part.

Optionally, the 3D scan of the subject body part from the target is acquired via the imaging lens of the imaging apparatus and a depth detector. Advantageously, the depth detector is employed to acquire depth information per pixel.

Optionally, the 3D scan of the subject body part from the target is acquired via 2D images from the imaging lens of the handheld imaging apparatus and a machine learning algorithm trained to predict depth information from 2D images of the same body part from different subjects. Advantageously, methods may be performed and 3D information obtained even in the absence of operational depth detector hardware.

Optionally, the method further comprises following causing the handheld imaging device to acquire the 3D scan of the subject body part from the target, determining whether or not a target completion condition is satisfied, and if the target completion condition is not satisfied, repeating the determining whether or not the imaging condition is satisfied, and if the imaging condition is satisfied, replacing the acquired 3D scan of the subject body part from the target with a replacement 3D scan of the subject body part from the target, and determining whether or not the target completion condition is satisfied. The target completion conditions provide a mechanism to control the progression through plural targets.

Optionally, the target completion condition is that the respective 3D scan of the subject body part from the target is acquired by the handheld imaging device, or wherein the target completion condition is based on an image quality characteristic of the respective 3D scan of the subject body part from the target and/or detection of a predefined surface feature within the respective 3D scan of the subject body part from the target.

Optionally, the one or more targets rendered in the dynamic image are a subset of a larger set of targets, and, following each occurrence of the target completion condition being satisfied, the web server is caused to render in the dynamic image a further target from the larger set of targets not already rendered in the dynamic image, until an overall completion condition is satisfied.

Optionally, the overall completion condition is that there are no further targets in the set of targets or that the target completion condition is satisfied for a predetermined number and/or predetermined subset of targets from the set of targets.

The overall completion condition is for the specific body part being scanned. Upon completion, if two or more body parts are to be scanned and one body part is pending, the method is repeated for the remaining body part(s).

In a particular example, the targets are rendered in the dynamic image one at a time in a predefined sequence. The predefined sequence may be configured to minimize aggregate distance between sequentially adjacent targets.

Optionally, the dynamic image renders more than one target concurrently, and the more than targets are rendered according to a first rendering mode if the respective target completion condition has not been satisfied, and according to a second rendering mode if the respective target completion condition has been satisfied.

Optionally, if it is determined that the imaging condition is not satisfied, determining whether or not an auxiliary imaging condition is satisfied for the one or more targets in the dynamic image, the auxiliary imaging condition being that the determined relative 3D orientation and the determined relative 3D position are within an auxiliary predefined range of the target relative 3D orientation and the target relative 3D position of one of the one or more targets; and if the auxiliary imaging condition is satisfied, causing the handheld imaging device to obtain, as an auxiliary 3D scan, a 3D scan of the subject body part. Auxiliary scanning provides a means to assist in the post-processing of the 3D scans.

Optionally, the 3D scans of the subject body part from the targets satisfying the respective target completion conditions are stored at the local processing apparatus for post processing and/or output by the local processing apparatus for post processing.

Optionally, the method further comprises storing at the local processing apparatus for post processing and/or output by the local processing apparatus for post processing, the auxiliary 3D scan or scans of the subject body part.

Optionally, the imaging apparatus and the local processing apparatus are components of a single device, the single device being a smartphone or a tablet computer. A smartphone in the present context is a mobile phone with a camera, optionally with a depth detector, and with processing hardware (for example, CPU and/or GPU) for executing a pre-trained machine learning algorithm.

Optionally, the dynamic image illustrates the determined relative 3D orientation and the determined relative 3D position by illustrating an avatar having at least the body part, and optionally also having a surrounding region of the body, the orientation and position of the avatar within the image being fixed in the dynamic image. Advantageously, the avatar imitates reality and thus facilitates comprehension of the dynamic image by the subject.

Optionally, the web server is configured to host instances of the web page comprising the dynamic image for each of a plurality of subjects, each subject being associated with a unique access code, wherein the method further comprises: at the local processing apparatus: outputting the determined relative 3D orientation and the determined relative 3D position to the web server in association with the access code unique to the subject; at the web server: allowing a web-enabled device to access the web page comprising the dynamic image illustrating the determined relative 3D orientation and the determined relative 3D position associated with the code on condition of receipt of the same access code from the web-enabled device.

Optionally, the automatically detecting a position of each of a plurality of key surface features on the body part within the image to determine a relative 3D orientation of the imaging lens to the body part comprises: feeding the two-dimensional image into a machine learning algorithm pre-trained to detect the location of the body part, such as within a bounding box, whether the body part is a left side body part or a right body part ear, and the position within the image of the plurality of key surface features on the body part.

Optionally, each image of the video stream of images is a two-dimensional image composed of pixels and is associated with a respective depth map, either through further processing of the two dimensional image or directly obtained contemporaneously by the handheld imaging device and providing a depth measurement for each pixel in the two-dimensional image, and wherein automatically detecting a position of each of a plurality of key surface features on the body part within the image to determine a relative 3D orientation of the imaging lens to the body part comprises: acquiring from the respective depth map a depth measurement for the detected position of each of the plurality of key surface features to define a three-dimensional position for each of the plurality of key surface features; fitting a reference plane to the three-dimensional positions for the plurality of key surface features, the reference plane being defined in 3D relative to the orientation of the imaging lens.

Optionally, the method further comprises, at the local processing apparatus or at a post processing server: combining the 3D scans of the body part to obtain a single composite 3D scan of the body part of the subject.

Figure 8:
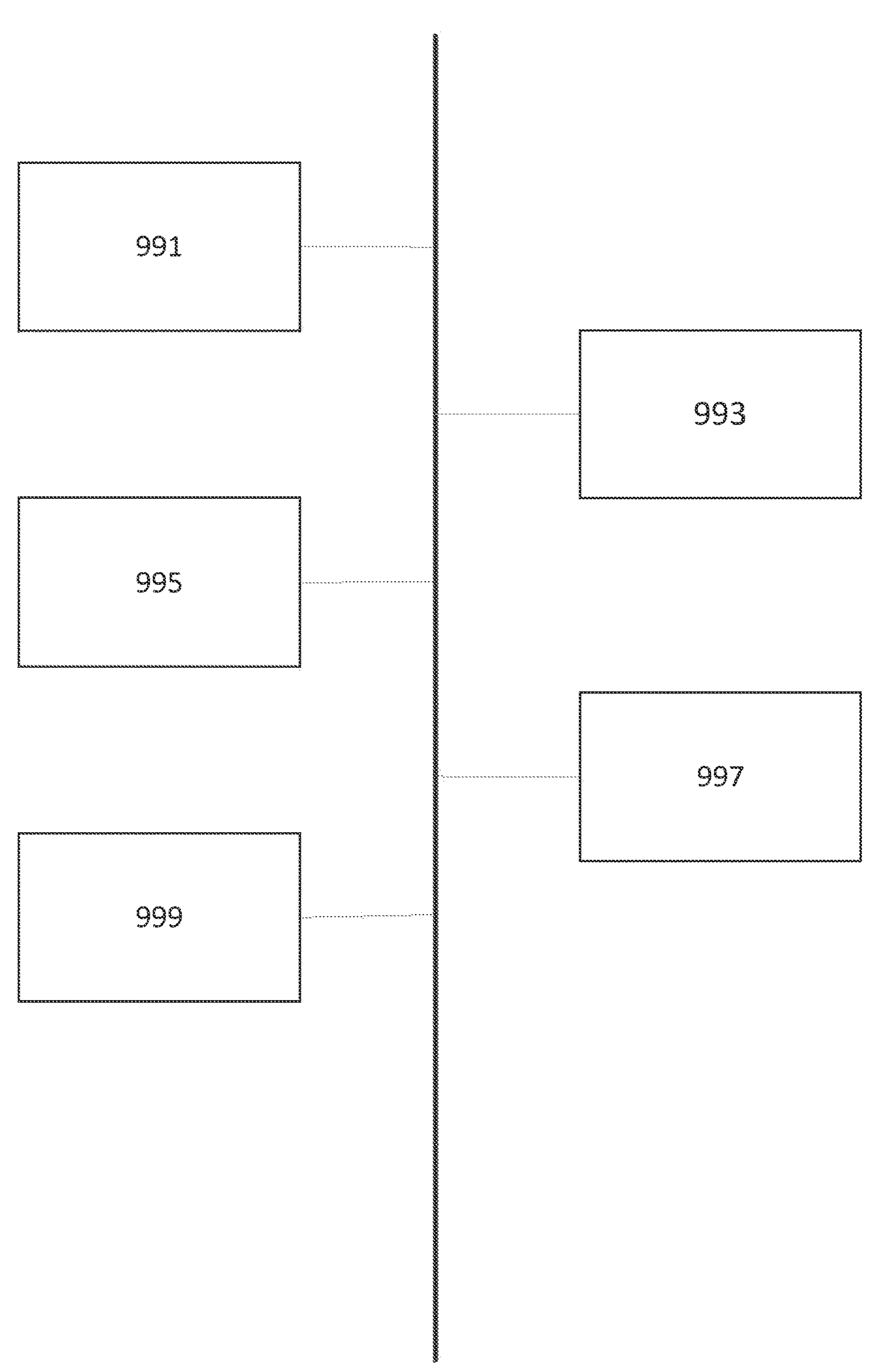
FIG. 8 illustrates a hardware arrangement of computing apparatus.

FIG. 8 is a schematic illustration of a hardware arrangement of a computing apparatus. The local processing apparatus 20 may be implemented by apparatus having an arrangement such as illustrated in FIG. 8. The web server 10 may be implemented by apparatus having an arrangement such as illustrated in FIG. 8. The web-enabled device 40 may be implemented by apparatus having an arrangement such as illustrated in FIG. 8. The handheld imaging apparatus 30 may be implemented by apparatus having an arrangement such as illustrated in FIG. 8. The post-processing server may be implemented by apparatus having an arrangement such as illustrated in FIG. 8.

The computing apparatus comprises a plurality of components interconnected by a bus connection. The bus connection is an exemplary form of data and/or power connection. Direct connections between components for transfer of power and/or data may be provided in addition or as alternative to the bus connection.

The computing apparatus comprises memory hardware 991 and processing hardware 993, which components are essential regardless of implementation. Further components are context-dependent, including a network interface 995, input devices 997, and a display unit 999.

The memory hardware 991 stores processing instructions for execution by the processing hardware 993. The memory hardware 991 may include volatile and/or non-volatile memory. The memory hardware 991 may store data pending processing by the processing hardware 993 and may store data resulting from processing by the processing hardware 993.

The processing hardware 993 comprises one or a plurality of interconnected and cooperative CPUs for processing data according to processing instructions stored by the memory hardware 991.

Implementations may comprise one computing device according to the hardware arrangement of FIG. 8, or a plurality of such devices operating in cooperation with one another. For example, a plurality of such devices operating in cooperation increases potential rate of data throughput.

A network interface 995 provides an interface for transmitting and receiving data over a network. Connectivity to one or more networks is provided. For example, a local area network and/or the internet. Connectivity may be wired and/or wireless.

Input devices 997 provide a mechanism to receive inputs from a user. For example, such devices may include one or more from among a mouse, a touchpad, a keyboard, an eye-gaze system, and a touch interface of a touchscreen. Inputs may be received over a network connection. For example, in the case of server computers, a user may connect to the server over a connection to another computing apparatus and provide inputs to the server using the input devices of the another computing apparatus.

A display unit 999 provides a mechanism to display data visually to a user. The display unit 999 may display graphical user interfaces by which certain locations of the display unit become functional as buttons or other means allowing for interaction with data via an input mechanism such as a mouse. A server may connect to a display unit 999 over a network.

What is claimed is:

1. A method, comprising:

at a handheld imaging apparatus, capturing a stream of images via an imaging lens and outputting the stream to a local processing apparatus, the images imaging a field of view including a subject ear;

at the local processing apparatus:

receiving the stream of images, and, on a repetitive basis per image:

automatically detecting a position of each of a plurality of key surface features on the ear within the image to determine a relative 3D orientation of the imaging lens to the ear;

based on the determined relative orientation and positions of the key surface features within the image, determining a relative 3D position of the imaging lens to the ear; and outputting, to a web server, the determined relative 3D orientation and the determined relative 3D position;

at the web server:

hosting a web page comprising a dynamic image rendering:

the determined relative 3D orientation and the determined relative 3D position;

one or more targets, each target being a target relative 3D orientation and target relative 3D position of the imaging lens to the ear; and periodically updating the dynamic image rendering to illustrate the most recently determined relative 3D orientation and determined relative 3D position; and at the handheld imaging apparatus, acquiring a 3D scan of the subject ear from the one or more targets.

2. The method according to claim 1, further comprising, at a web-enabled device having a display unit, accessing the web page and displaying the dynamic image.

3. The method according to claim 1, further comprising:

at the local processing apparatus, on a repetitive basis per image:

determining whether or not an imaging condition is satisfied for the one or more targets in the dynamic image, the imaging condition being that the most recently determined relative 3D orientation and the determined relative 3D position are within a predefined range of the target relative 3D orientation and the target relative 3D position of one of the one or more targets; and if the imaging condition is satisfied, causing the handheld imaging apparatus to acquire a 3D scan of the subject ear from the target relative 3D orientation and the target relative 3D position.

4. The method according to claim 3, wherein:

the 3D scan of the subject ear from the target is acquired via the imaging lens of the handheld imaging apparatus and a depth sensor; or the 3D scan of the subject ear from the target is acquired via 2D images from the imaging lens of the handheld imaging apparatus and a machine learning algorithm trained to predict depth information from 2D images of ears.

5. The method according to claim 1, further comprising:

following causing the handheld imaging apparatus to acquire the 3D scan of the subject ear from the target, determining whether or not a target completion condition is satisfied, and if the target completion condition is not satisfied, repeating the determining whether or not the imaging condition is satisfied, and if the imaging condition is satisfied, replacing the acquired 3D scan of the subject ear from the target with a replacement 3D scan of the subject ear from the target, and determining whether or not the target completion condition is satisfied, wherein the target completion condition is that the respective 3D scan of the subject ear from the target is acquired by the handheld imaging apparatus, or wherein the target completion condition is based on an image quality characteristic of the respective 3D scan of the subject ear from the target and/or detection of a predefined surface feature within the respective 3D scan of the subject ear from the target.

6. The method according to claim 1, wherein the one or more targets rendered in the dynamic image are a subset of a larger set of targets, and, following each occurrence of the target completion condition being satisfied, the web server is caused to render in the dynamic image a further target from the larger set of targets not already rendered in the dynamic image, until an overall completion condition is satisfied, wherein the overall completion condition is that there are no further targets in the set of targets or that the target completion condition is satisfied for a predetermined number and/or predetermined subset of targets from the set of targets.

7. The method according to claim 6, wherein:

the targets are rendered in the dynamic image one at a time in a predefined sequence, or the dynamic image renders more than one target concurrently, and the more than targets are rendered according to a first rendering mode if the respective target completion condition has not been satisfied, and according to a second rendering mode if the respective target completion condition has been satisfied.

8. The method according to claim 1, further comprising if it is determined that the imaging condition is not satisfied, determining whether or not an auxiliary imaging condition is satisfied for the one or more targets in the dynamic image, the auxiliary imaging condition being that the determined relative 3D orientation and the determined relative 3D position are within an auxiliary predefined range of the target relative 3D orientation and the target relative 3D position of one of the one or more targets; and if the auxiliary imaging condition is satisfied, causing the handheld imaging device to obtain, as an auxiliary 3D scan, a 3D scan of the subject ear.

9. The method according to claim 1, further comprising:

storing the 3D scans of the subject ear from the targets satisfying the respective target completion conditions at the local processing apparatus for post processing and/or output by the local processing apparatus for post processing; or storing at the local processing apparatus for post processing and/or output by the local processing apparatus for post processing, the auxiliary 3D scan or scans of the subject ear.

10. The method according to claim 1, wherein the dynamic image illustrates the determined relative 3D orientation and the determined relative 3D position by illustrating an avatar having at least an ear, the orientation and position of the avatar within the image being fixed in the dynamic image.

11. The method according to claim 1, wherein automatically detecting a position of each of a plurality of key surface features on the ear within the image to determine a relative 3D orientation of the imaging lens to the ear comprises feeding the two-dimensional image into a machine learning algorithm pre-trained to detect the location of the ear, such as within a bounding box, whether the ear is a left side ear or a right side ear, and the position within the image of the plurality of key surface features on the ear.

12. The method according to claim 1, wherein:

each image of the video stream of images is a two-dimensional image composed of pixels and is associated with a respective depth map, either through further processing of the two dimensional image or directly obtained contemporaneously by the handheld imaging device and providing a depth measurement for each pixel in the two-dimensional image, and automatically detecting a position of each of a plurality of key surface features on the ear within the image to determine a relative 3D orientation of the imaging lens to the ear comprises:

acquiring from the respective depth map a depth measurement for the detected position of each of the plurality of key surface features to define a three-dimensional position for each of the plurality of key surface features; and fitting a reference plane to the three-dimensional positions for the plurality of key surface features, the reference plane being defined in 3D relative to the orientation of the imaging lens.

13. The method according to claim 1, further comprising, at the local processing apparatus or at a post processing server, combining the 3D scans of the ear to obtain a single composite 3D scan of the ear of the subject.

14. The method according to claim 1, wherein:

the handheld imaging apparatus is a smartphone or a tablet device having a front or back facing depth sensor and an imaging lens, the imaging lens is a front or back facing lens in accordance with whether the depth sensor is front or back facing, and wherein each image of the stream of images includes pixel-wise depth measurements obtained via the front or back facing depth sensor, or the handheld imaging apparatus is a smartphone or a tablet device having a rear facing lens and a rear facing depth sensor, and wherein the imaging lens is the rear facing lens and the depth sensor is the rear facing depth sensor.

15. The method according to claim 1, further comprising, at the local processing apparatus:

outputting, to a web server, a live stream from the handheld imaging apparatus, the live stream being either the stream of images or a series of images extracted from the stream of images, wherein at the web server the live stream is rendered in addition to the dynamic image, and the dynamic image is rendered as an overlay on the rendered live stream scaled and positioned so that the ear relative to which the relative 3D position and the relative 3D orientation are determined is co-located and co-oriented with an ear in the live stream.

16. The method according to claim 15, wherein the live stream is a series of images extracted from the stream of images obtained by the handheld imaging apparatus, and in the live stream:

a frequency of images is reduced relative to the stream of images obtained by the handheld imaging apparatus so that 1 in every n images is included in the live stream; and/or a resolution of images is reduced relative to the stream of images obtained by the handheld imaging apparatus.

17. A system comprising a handheld imaging apparatus, a processing apparatus, and a web server:

the handheld imaging apparatus being configured to capture a stream of images via an imaging lens and outputting the stream to a local processing apparatus, the images imaging a field of view including a subject ear;

the processing apparatus being configured to:

receive the stream of images, and, on a repetitive basis per image:

automatically detect a position of each of a plurality of key surface features on the ear within the image to determine a relative 3D orientation of the imaging lens to the ear;

based on the determined relative orientation and positions of the key surface features within the image, determine a relative 3D position of the imaging lens to the ear; and output, to the web server, the determined relative 3D orientation and the determined relative 3D position;

the web server being configured to:

host a web page comprising a dynamic image, and rendering the dynamic image to include:

the determined relative 3D orientation and the determined relative 3D position;

one or more targets, each target being a target relative 3D orientation and target relative 3D position of the imaging lens to the ear;

render the dynamic image including periodically updating the dynamic image to illustrate the most recently determined relative 3D orientation and determined relative 3D position;

the handheld imaging apparatus being further configured to acquire a 3D scan of the subject ear from the one or more targets.

18. The system according to claim 17, further comprising a web-enabled device having a display unit, the web-enabled device being configured to access the web page and display the dynamic image.

19. The system according to claim 17, further comprising:

a post processing server being configured to combine 3D scans of the ear from more than one target to obtain a single composite 3D scan of the ear of the subject.

20. A non-transitory computer-readable medium storing processing instructions, which, when executed by a local processing apparatus and a web server having respective memory hardware and processing hardware, cause the local processing apparatus and the web server to perform a method, including:

causing a handheld imaging apparatus to capture a stream of images via an imaging lens and outputting the stream to a local processing apparatus, the images imaging a field of view including a subject ear;

at the local processing apparatus:

receiving the stream of images, and, on a repetitive basis per image:

automatically detecting a position of each of a plurality of key surface features on the ear within the image to determine a relative 3D orientation of the imaging lens to the ear;

based on the determined relative orientation and positions of the key surface features within the image, determining a relative 3D position of the imaging lens to the ear; and outputting, to the web server, the determined relative 3D orientation and the determined relative 3D position;

at the web server:

hosting a web page comprising a dynamic image rendering of:

the determined relative 3D orientation and the determined relative 3D position;

one or more targets, each target being a target relative 3D orientation and target relative 3D position of the imaging lens to the ear; and periodically updating the dynamic image to illustrate the most recently determined relative 3D orientation and determined relative 3D position; and causing the handheld imaging apparatus to acquire a 3D scan of the subject ear from the one or more targets.

* * * * *